US010734624B1

(12) United States Patent
Sodeyama et al.

(10) Patent No.: US 10,734,624 B1
(45) Date of Patent: Aug. 4, 2020

(54) BATTERY, BATTERY CAN, BATTERY PACK, ELECTRONIC DEVICE, ELECTRIC VEHICLE, ELECTRICITY STORAGE DEVICE, AND ELECTRIC POWER SYSTEM

(71) Applicant: Murata Manufacturing Co., Ltd., Kyoto (JP)

(72) Inventors: Kunio Sodeyama, Fukushima (JP); Masafumi Umekawa, Fukushima (JP); Kazunori Noguchi, Fukushima (JP); Takao Mori, Fukushima (JP); Kazuhiko Suzuki, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 421 days.

(21) Appl. No.: 15/754,935

(22) PCT Filed: Aug. 15, 2016

(86) PCT No.: PCT/JP2016/003743
§ 371 (c)(1),
(2) Date: Feb. 23, 2018

(87) PCT Pub. No.: WO2017/043023
PCT Pub. Date: Mar. 16, 2017

(30) Foreign Application Priority Data

Sep. 9, 2015 (JP) .................. 2015-177379

(51) Int. Cl.
H01M 2/12 (2006.01)
H01M 2/02 (2006.01)
H01M 2/10 (2006.01)
H01M 4/525 (2010.01)
H02J 7/00 (2006.01)
B60L 58/10 (2019.01)
H02J 3/38 (2006.01)
H01M 10/0525 (2010.01)

(52) U.S. Cl.
CPC ............ H01M 2/1241 (2013.01); B60L 58/10 (2019.02); H01M 2/02 (2013.01); H01M 2/1077 (2013.01); H01M 4/525 (2013.01); H01M 10/0525 (2013.01); H02J 3/381 (2013.01); H02J 7/00712 (2020.01); H01M 2220/20 (2013.01)

(58) Field of Classification Search
None
See application file for complete search history.

(56) References Cited

FOREIGN PATENT DOCUMENTS

| CN | 104126238 | 10/2014 |
| JP | H06-333548 A | 12/1994 |
| JP | H10-092397 A | 4/1998 |

(Continued)

OTHER PUBLICATIONS

Japan Patent Office, International Search Report issued in PCT Application No. PCT/JP2016/003743 (related to above-captioned patent application), dated Sep. 13, 2016.

(Continued)

Primary Examiner — Wojciech Haske
(74) Attorney, Agent, or Firm — K&L Gates LLP

(57) ABSTRACT

A battery includes: an electrode body; and a battery can housing the electrode body and having a bottom portion. The bottom portion has an arc-shaped groove. An opening angle of the groove with respect to a center of the bottom portion is 0.5 degrees or more and 56 degrees or less. A ratio of an inner diameter of the groove with respect to an outer diameter of the bottom portion is 44% or more and 77% or less.

19 Claims, 12 Drawing Sheets

(56) References Cited

FOREIGN PATENT DOCUMENTS

| JP | H11-073934 A | 3/1999 |
|----|--------------|--------|
| JP | 2000-311669 A | 11/2000 |
| JP | 2006-517724 A | 7/2006 |
| JP | 2009-538507 A | 11/2009 |

OTHER PUBLICATIONS

Japan Patent Office, Written Opinion issued in PCT Application No. PCT/JP2016/003743 (related to above captioned patent application), dated Sep. 13, 2016.
Japanese Office Action dated Apr. 2, 2019 in corresponding Japanese Application No. 2017-538851.

FIG. 2
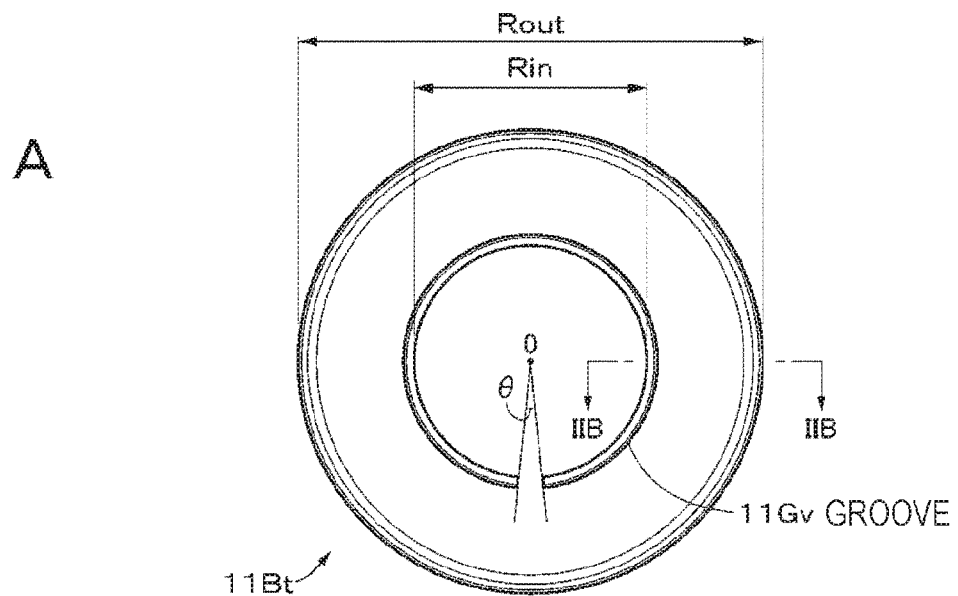
A
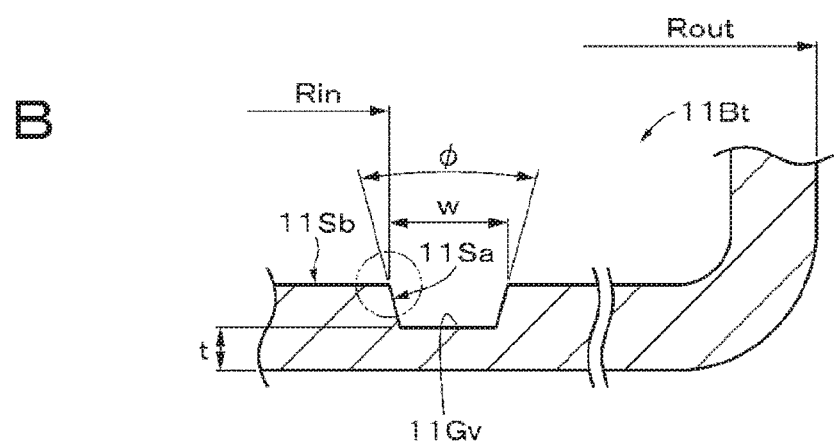
B
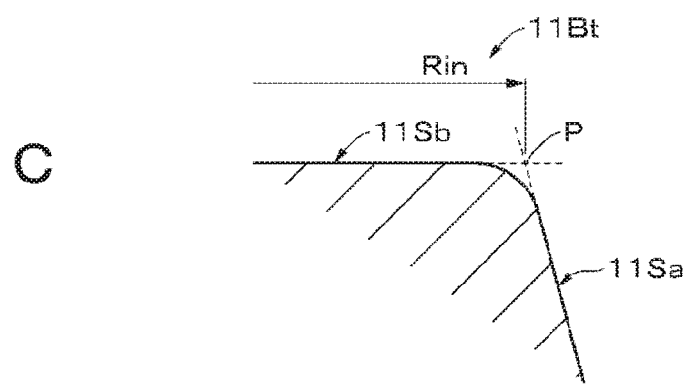
C

FIG. 6
A
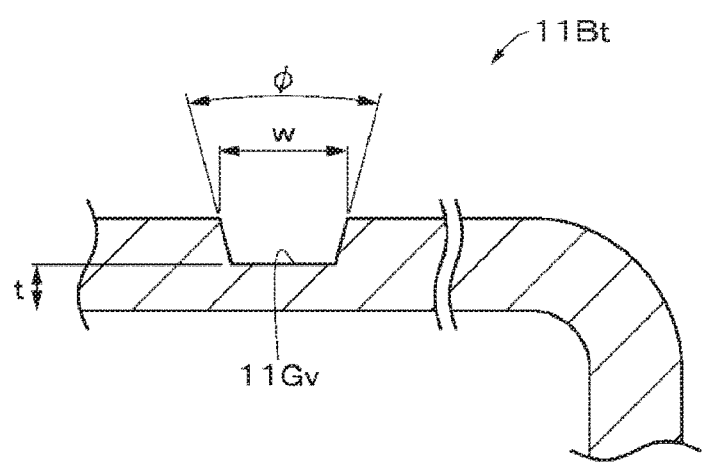
B
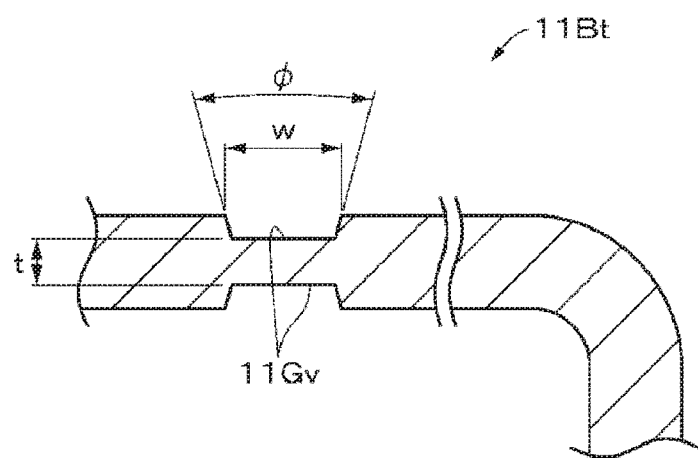

FIG. 10
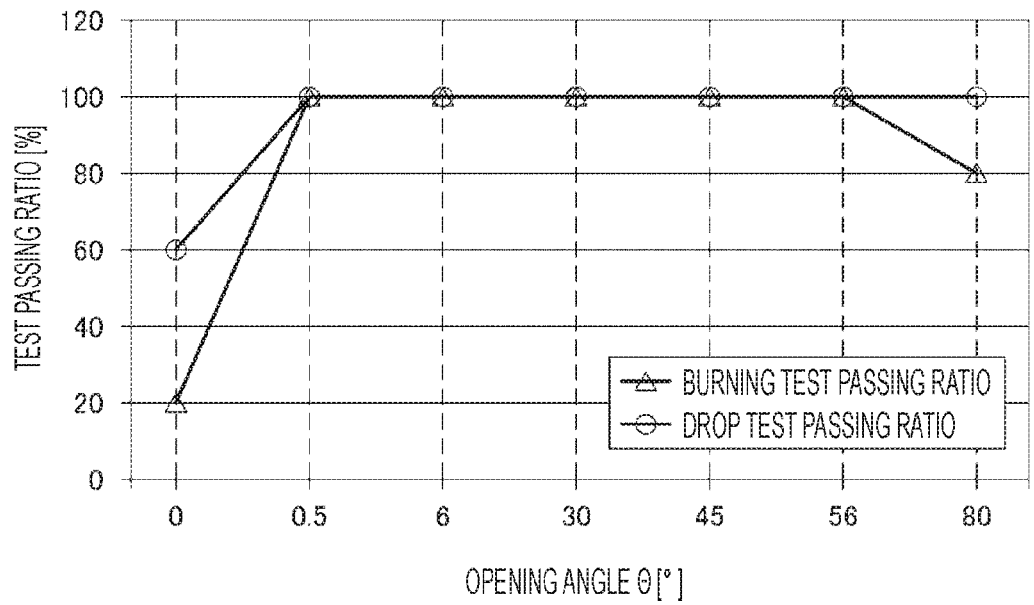
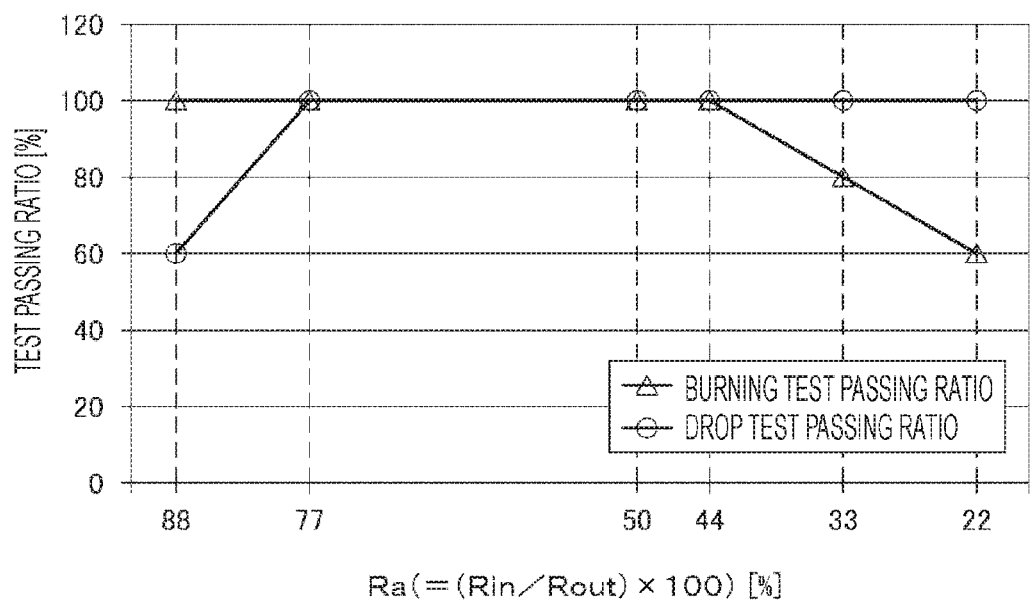

FIG. 11
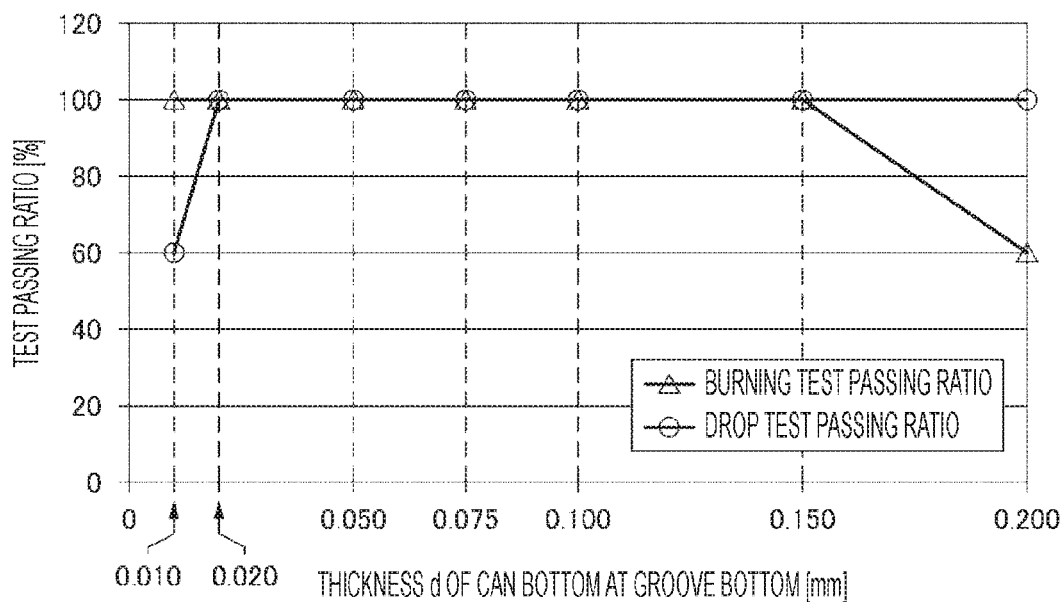
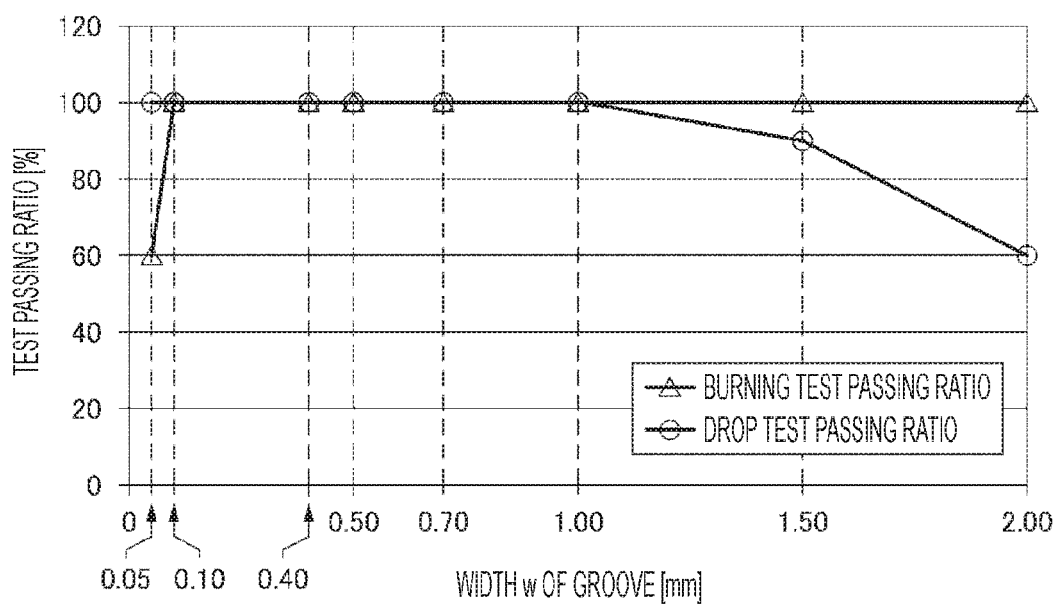

a battery can housing the electrode body and having a bottom portion, in which the bottom portion has an arc-shaped groove, an opening angle of the groove with respect to a center of the arc is 0.5 degrees or more and 56 degrees or less, and a ratio of an inner diameter of the groove with respect to an outer diameter of the bottom portion is 44% or more and 77% or less.

BATTERY, BATTERY CAN, BATTERY PACK, ELECTRONIC DEVICE, ELECTRIC VEHICLE, ELECTRICITY STORAGE DEVICE, AND ELECTRIC POWER SYSTEM

CROSS-REFERENCE TO RELATED APPLICATIONS

The present application claims the benefit of International Application No. PCT/JP2016/003743, filed Aug. 15, 2016, which claims priority to Japanese Application No. 2015-177379, filed Sep. 9, 2015, the disclosures of which are incorporated herein by reference.

BACKGROUND

The present technology relates to a battery, a battery can, a battery pack, an electronic device, an electric vehicle, an electricity storage device, and an electric power system.

BACKGROUND ART

In recent years, a lithium ion secondary battery is used inmost electronic devices. In the lithium ion secondary battery, for example, when abnormal heat is applied in an overcharged state, a gas pressure abnormally increases on a can bottom side (bottom side), and rupture of the battery may occur. Particularly in a lithium ion secondary battery with high capacity and high output, not only the amount of gas generated when abnormal heat is applied is large, but also the diameter of a center hole of an electrode body is also reduced.

Therefore, release of gas to a sealing portion side (top side) of the battery decreases, and a gas pressure tends to abnormally increase on a can bottom side.

In order to prevent such rupture of a battery as described above, there is proposed a battery in which a groove is disposed in a can bottom of a battery can such that the groove portion is broken when abnormal heat is applied to the battery and generated gas is discharged from the can bottom. For example, Patent Document 1 describes that a breaking pressure of a thin wall portion of a bottom portion of a battery case due to a gas pressure generated in a battery is larger than a breaking pressure of a valve body of an explosion-proof sealing plate and is smaller than a withstanding pressure of a battery sealing portion.

CITATION LIST

Patent Document

Patent Document 1: Japanese Patent Application Laid-Open No. 6-333548

SUMMARY

Problems to be Solved by the Invention

An object of the present technology is to provide a battery, a battery can, a battery pack, an electronic device, an electric vehicle, an electricity storage device, and an electric power system capable of improving safety when abnormal heat is applied while a decrease in mechanical strength of a bottom portion of the battery can is suppressed.

Solutions to Problems

In order to solve the above problems, a first aspect of the present technology is a battery including: an electrode body; and a battery can housing the electrode body and having a bottom portion, in which the bottom portion has an arc-shaped groove, an opening angle of the groove with respect to a center of the arc is 0.5 degrees or more and 56 degrees or less, and a ratio of an inner diameter of the groove with respect to an outer diameter of the bottom portion is 44% or more and 77% or less.

A second aspect of the present technology is a battery pack including the battery of the first aspect of the present technology and a control unit for controlling the battery.

A third aspect of the present technology is an electronic device including the battery of the first aspect of the present technology and receiving electric power from the battery.

A fourth aspect of the present technology is an electric vehicle including the battery of the first aspect of the present technology, a converter for converting electric power supplied from the battery into a driving force of a vehicle, and a control device for performing information processing regarding vehicle control on the basis of information regarding the battery.

A fifth aspect of the present technology is an electricity storage device including the battery of the first aspect of the present technology and supplying electric power to an electronic device connected to the battery.

A sixth aspect of the present technology is an electric power system including the battery of the first aspect of the present technology and receiving electric power from the battery.

A seventh aspect of the present technology is a battery can including a bottom portion with an arc-shaped groove, in which an opening angle of the groove with respect to a center of the arc is 0.5 degrees or more and 56 degrees or less, and a ratio of an inner diameter of the groove with respect to an outer diameter of the bottom portion is 44% or more and 77% or less.

Effects of the Invention

As described above, the present technology can improve safety when abnormal heat is applied while a decrease in mechanical strength of a bottom portion of a battery can is suppressed.

BRIEF DESCRIPTION OF DRAWINGS

FIG. 2A is a plan view exemplifying a can bottom with an arc-shaped groove. FIG. 2B is a cross-sectional view taken along line IIB-IIB in FIG. 2A. FIG. 2C is an enlarged cross-sectional view of a portion surrounded by a two-dot chain line in FIG. 2B.

FIG. 6A is a cross-sectional view illustrating a configuration example of a can bottom of a non-aqueous electrolyte secondary battery according to Modification Example 1 of the first embodiment of the present technology. FIG. 6B is a cross-sectional view illustrating a configuration example of a can bottom of a non-aqueous electrolyte secondary battery according to Modification Example 2 of the first embodiment of the present technology.

FIG. 10A is a graph illustrating a relationship between an opening angle θ of a groove 11Gv with respect to a center of a can bottom and a test passing ratio. FIG. 10B is a graph illustrating a relationship between a ratio Ra of an inner diameter $R_{in}$ of a groove with respect to an outer diameter $R_{out}$ of a can bottom and a test passing ratio.

FIG. 11A is a graph illustrating a relationship between a thickness t of a can bottom at a groove bottom and a test passing ratio. FIG. 11B is a graph illustrating a relationship between a width w of a groove and a test passing ratio.

DETAILED DESCRIPTION

Embodiments of the present technology will be described in the following order.
1. First embodiment (example of cylinder type battery)
2. Second embodiment (examples of battery pack and electronic device)
3. Third embodiment (example of electricity storage system)
4. Fourth embodiment (example of electric vehicle)

1. First Embodiment

[Configuration of Battery]

Figure 1:
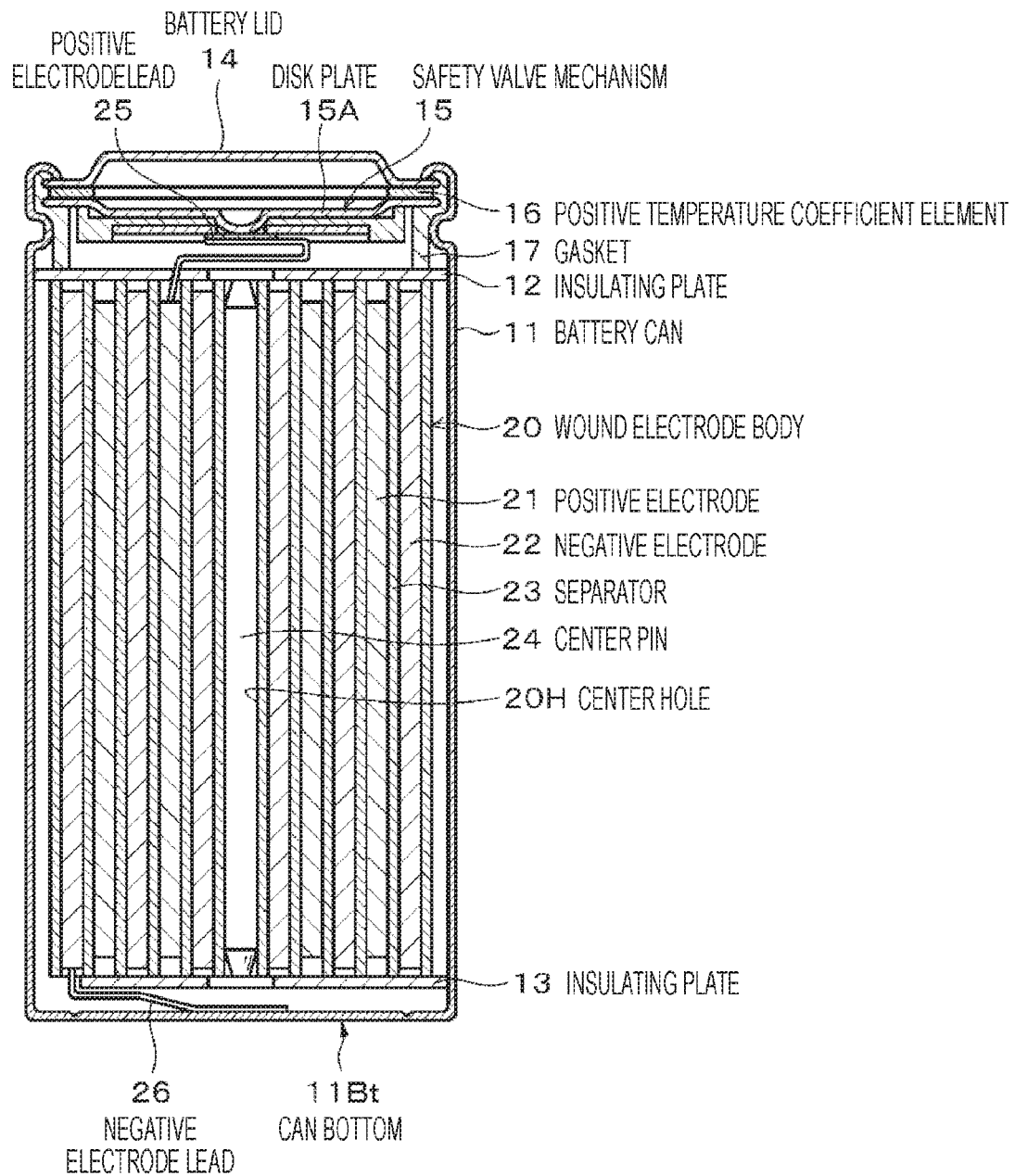
FIG. 1 is a cross-sectional view illustrating a configuration example of a non-aqueous electrolyte secondary battery according to a first embodiment of the present technology.

Hereinafter, a configuration example of a non-aqueous electrolyte secondary battery (hereinafter, simply referred to as a "battery") according to a first embodiment of the present technology will be described with reference to FIG. 1. For example, this battery is a so-called lithium ion secondary battery in which a capacity of a negative electrode is expressed by a capacity component due to occlusion of lithium (Li) which is an electrode reactant and release thereof. This battery is a so-called cylinder type battery, and includes a wound electrode body 20 obtained by stacking a pair of strip-shaped positive electrode 21 and strip-shaped negative electrode 22 through a separator 23 and winding the resulting stacked body in an approximately hollow cylinder-shaped battery can 11. The battery can 11 is constituted by nickel (Ni)-plated iron (Fe), and one end thereof is closed and the other end thereof is open. An electrolytic solution as an electrolyte is injected into the battery can 11, and the positive electrode 21, the negative electrode 22, and the separator 23 are impregnated with the electrolytic solution. In addition, a pair of insulating plates 12 and 13 is disposed perpendicularly to a winding peripheral surface so as to sandwich the wound electrode body 20. Note that in the following description, of both end sides of the battery, a closed end side of the battery can 11 may be referred to as a "bottom side", and an open end side of the battery can 11 on the opposite side thereof may be referred to as a "top side".

A battery lid 14, a safety valve mechanism 15 disposed inside the battery lid 14, and a positive temperature coefficient element (PTC element) 16 are attached to the open end of the battery can 11 by being crimped through a sealing gasket 17. This seals an inside of the battery can 11. For example, the battery lid 14 is constituted by a material similar to the battery can 11. The safety valve mechanism 15 cleaves, for example, in a case where gas is generated inside the battery can 11 at the time of abnormality, and discharges the gas from a top side of the battery. In addition, the safety valve mechanism 15 is electrically connected to the battery lid 14. In a case where an internal pressure of the battery becomes a certain level or more by internal short circuit, heating from an outside, or the like, a disk plate 15A is reversed to cut electrical connection between the battery lid 14 and the wound electrode body 20. For example, the sealing gasket 17 is constituted by an insulating material, and a surface thereof is coated with asphalt.

The wound electrode body 20 has a substantially cylindrical shape. The wound electrode body 20 has a center hole 20H penetrating the wound electrode body 20 from a center of one end surface thereof toward a center of the other end surface thereof. A center pin 24 is inserted into the center hole 20H. The center pin 24 has a tubular shape with both ends open. Therefore, in a case where gas is generated in the battery can 11, the center pin 24 functions as a flow path guiding the gas from a bottom side to a top side.

A positive electrode lead 25 constituted by aluminum (Al) or the like is connected to the positive electrode 21 of the wound electrode body 20. A negative electrode lead 26 constituted by nickel or the like is connected to the negative electrode 22. The positive electrode lead 25 is electrically connected to the battery lid 14 by being welded to the safety valve mechanism 15. The negative electrode lead 26 is welded and electrically connected to the battery can 11.

In the battery according to the first embodiment, an open circuit voltage (that is, battery voltage) in a fully charged state per pair of the positive electrode 21 and the negative electrode 22 may be 4.2 V or less, but may be designed so as to be higher than 4.2 V, preferably 4.4 V or more and 6.0 V or less, and more preferably 4.4 V or more and 5.0 V or less. By a higher battery voltage, a higher energy density can be obtained.

Hereinafter, the battery can 11, the positive electrode 21, the negative electrode 22, the separator 23, and an electrolytic solution constituting the battery according to the first embodiment will be sequentially described.

(Battery Can)

The battery can 11 has a can bottom 11Bt as a bottom portion on a bottom side. When the can bottom 11Bt is viewed from a vertical direction, the can bottom 11Bt has a circular shape as illustrated in FIG. 2A. Of both surfaces of the can bottom 11Bt, a surface inside the battery can 11 (hereinafter, simply referred to as an "inner surface of the can bottom 11Bt") has one groove 11Gv as illustrated in FIGS. 2A and 2B. The groove 11Gv has an arc shape, more specifically a C shape or an inverted C shape. A center of the arc of the groove 11Gv preferably coincides with a center of the can bottom 11Bt. That is, the arc of the groove 11Gv is preferably concentric with an outer periphery of the can bottom 11Bt.

The battery can 11 in the first embodiment is preferably used for a battery having a volume energy density of more than 380 Wh/L, and more preferably used for a battery having a volume energy density of 430 Wh/L or more. This is because the amount of gas generated when abnormal heat is applied in an overcharged state or the like is particularly large in a battery having such a volume energy density, and a gas pressure in the battery tends to rise to a level higher than a gas release pressure (operation pressure) of the safety valve mechanism 15.

An opening angle θ of the groove 11Gv with respect to a center of the arc is 0.5 degrees or more and 56 degrees or less. Here, as illustrated in FIG. 2A, the opening angle θ of the groove 11Gv with respect to the center of the arc is obtained as an angle formed by two straight lines connecting both ends of an outer periphery of the groove 11Gv and a center O of the can bottom 11Bt.

If the opening angle θ is less than 0.5 degrees, since the opening angle θ is small, when abnormal heat is externally applied to a battery in an overcharged state or the like, the entire portion of the groove 11Gv of the can bottom 11Bt opens, and the contents of the battery may jump out. Furthermore, when a battery in an overcharged state or the like drops, the entire portion of the groove 11Gv of the can bottom 11Bt opens, and the contents of the battery may jump out of the battery can 11. Meanwhile, if the opening angle θ is more than 56 degrees, since the opening angle θ is large, when abnormal heat is externally applied to a battery in an overcharged state or the like, an opening area of the can bottom 11Bt is small, and the battery may rupture.

Incidentally, in a case where the groove 11Gv is annular, when abnormal heat is applied to a battery in an overcharged state or the like, or when a battery in an overcharged state or the like drops, the entire groove 11Gv largely opens, and therefore the contents of the battery may jump out of the battery can 11.

A ratio Ra of an inner diameter (diameter) $R_{in}$ of the groove 11Gv with respect to an outer diameter (diameter) $R_{out}$ of the can bottom 11Bt ($=(R_{in}/R_{out})\times 100$) is 44% or more and 77% or less. If the ratio Ra is less than 44%, since the groove 11Gv is too far from an outer periphery of the can bottom 11Bt, when abnormal heat is applied to a battery in an overcharged state or the like, the battery may rupture. If the ratio Ra is more than 77%, when a battery in an overcharged state or the like drops, since an opening area of the can bottom 11Bt is large, the contents of the battery may jump out.

Figure 3:
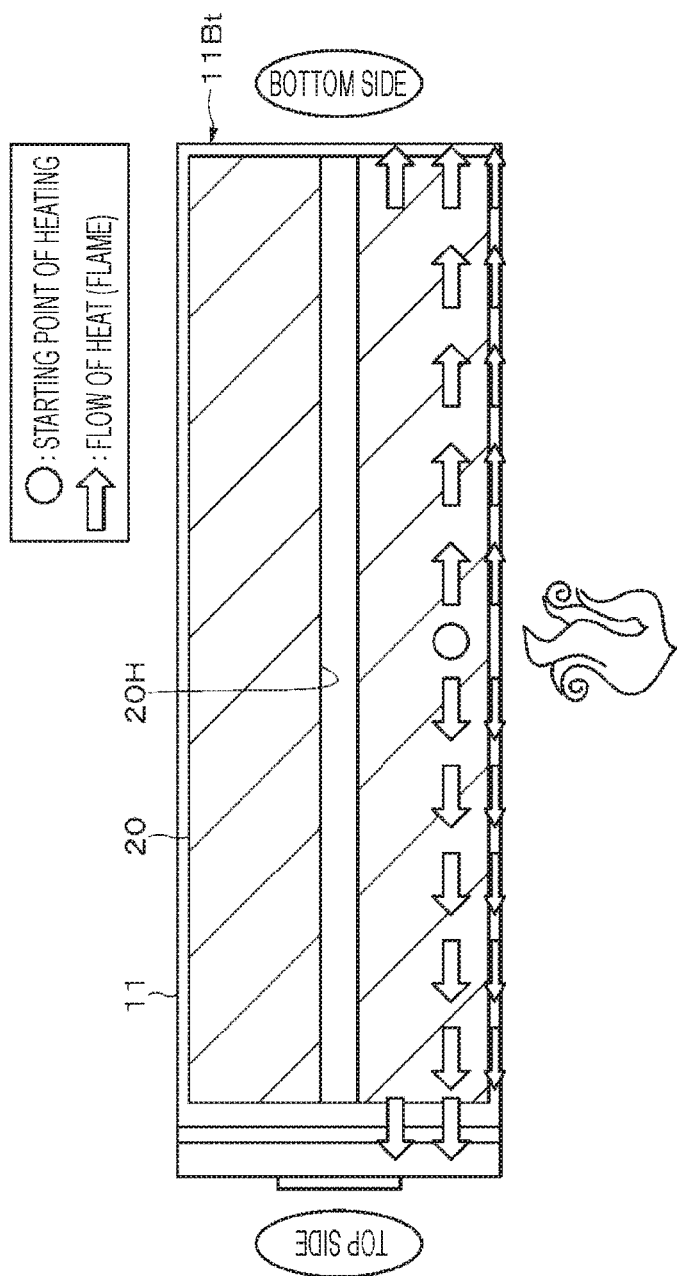
FIG. 3 is a schematic diagram for explaining a flow of heat when abnormal heat is applied to a battery.

Here, a reason for setting the ratio Ra to 44% or more will be described more specifically with reference to FIG. 3. When abnormal heat is externally applied to a battery in an overcharged state or the like, heat (flame) is generated from an outer peripheral portion of the wound electrode body 20. The heat has a function of softening the groove 11Gv of the can bottom 11Bt, and softens the groove 11Gv more easily as the groove 11Gv is closer to the outer peripheral portion of the wound electrode body 20. When the ratio Ra is 44% or more, since the groove 11Gv is close to the outer peripheral portion of the wound electrode body 20, when abnormal heat is externally applied to a battery in an overcharged state or the like, the groove 11Gv of the can bottom 11Bt is easily softened. Therefore, the groove 11Gv of the can bottom 11Bt cleaves due to an increase in gas pressure on a bottom side by generated gas, and the gas can be released to an outside. Meanwhile, when the ratio Ra is less than 44%, since the groove 11Gv is far away from the outer peripheral portion of the wound electrode body 20, when abnormal heat is externally applied to a battery in an overcharged state or the like, the groove 11Gv is hardly softened. Therefore, even if the gas pressure on the bottom side rises due to the generated gas, the can bottom 11Bt does not cleave, and it may be impossible to release the gas to an outside.

In a case where the groove 11Gv has a tapered shape narrowing from an opening side of the groove 11Gv toward a bottom portion side, the inner diameter Rin of the groove 11Gv is determined at a corner position formed at a boundary between an inner side surface 11Sa of the groove 11Gv and a bottom surface 11Sb of the can bottom 11Bt. Furthermore, as illustrated in FIG. 2C, in a case where the boundary between the inner side surface 11Sa of the groove 11Gv and the bottom surface 11Sb of the can bottom 11Bt has an R shape or the like, the inner diameter Rin of the groove 11Gv is determined at an intersection P between a surface obtained by imaginarily extending the inner side surface 11Sa of the groove 11Gv and a surface obtained by imaginarily extending the bottom surface 11Sb of the can bottom 11Bt.

The thickness t of the can bottom 11Bt at the bottom of the groove 11Gv (hereinafter, simply referred to as a "bottom thickness of the groove 11Gv") is preferably 0.020 mm or more and 0.150 mm or less. If the bottom thickness t of the groove 11Gv is less than 0.020 mm, when a battery such in an overcharged state or the like drops, the contents of the battery may jump out of the battery can 11. If the bottom thickness t of the groove 11Gv is more than 0.150 mm, when abnormal heat is applied to a battery in an overcharged state or the like, the battery will rupture. Incidentally, in a case where the bottom of the groove 11Gv is curved, for example, and the bottom thickness of the groove 11Gv is not uniform, the thickness of the thinnest portion of the bottom thickness of the groove 11Gv is defined as the bottom thickness of the groove 11Gv.

The width w of the groove 11Gv is preferably 0.10 mm or more and 1.00 mm or less. If the width w is less than 0.10 mm, when abnormal heat is applied to a battery in an overcharged state or the like, the battery will rupture. If the width w is more than 1.00 mm, when a battery in an overcharged state or the like drops, the contents of the battery may jump out of the battery can 11. Incidentally, in a case where a side surface of the groove 11Gv is a slope, a curved surface, or the like, the width of the widest portion of the width of the groove 11Gv displaced in a thickness direction of the can bottom 11Bt is defined as the width of the groove 11Gv. The opening angle φ of the slope of the groove 11Gv is, for example, 0 degrees or more and 90 degrees or less.

A gas release pressure (cleavage pressure) of the groove 11Gv is preferably higher than a gas release pressure (operation pressure) of the safety valve mechanism 15. This is because the groove 11Gv of the can bottom 11Bt is intended to release gas to an outside of a battery in an overcharged state or the like when abnormal heat is applied to the battery, and therefore it is necessary to prevent cleavage of the groove 11Gv during normal use. The gas release pressure of the groove 11Gv is preferably lower than a battery internal pressure at which a sealing portion of a battery in an overcharged state or the like is broken. This is because, when abnormal heat is applied to a battery in an overcharged state or the like, gas can be discharged to an outside of the battery by cleavage of the groove 11Gv before the battery ruptures. Specifically, the gas release pressure of the groove 11Gv is preferably within a range of 20 kgf/cm$^2$ or more and 100 kgf/cm$^2$ or less.

A cross-sectional shape of the groove 11Gv is, for example, a substantially polygonal shape, a substantially partially circular shape, a substantially partially elliptical shape, or an indefinite shape, but is not limited thereto. A curvature R or the like may be given to a top of the polygonal shape. Examples of the polygonal shape include a triangular shape, a quadrangular shape such as a trapezoidal shape or a rectangular shape, and a pentagonal shape. Here, the "partially circular shape" is a part of a circular shape, for example, a semicircular shape. The partially elliptical shape is a part of an elliptical shape, for example, a semielliptical shape. In a case where the groove 11Gv has a bottom surface, the bottom surface may be, for example, a flat surface, an uneven surface having a step, a curved surface having waviness, or a composite surface obtained by combining two or more of these surfaces.

(Positive Electrode)

Figure 4:
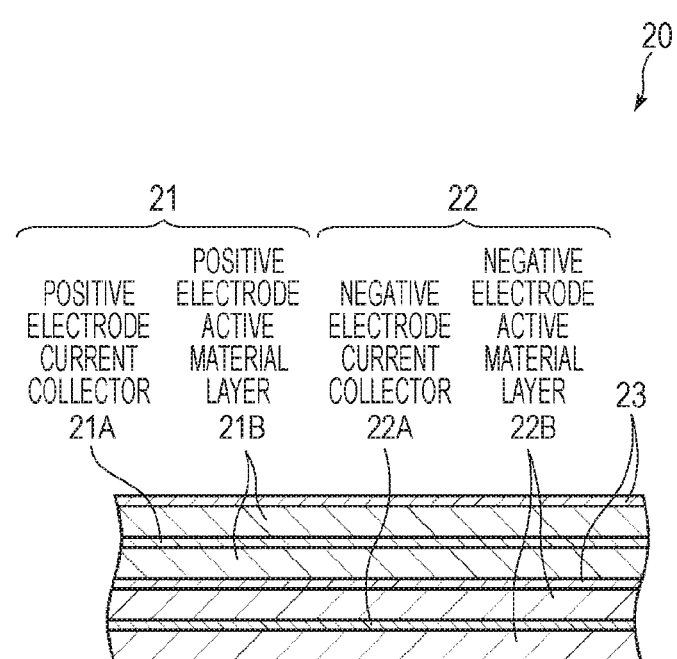
FIG. 4 is an enlarged cross-sectional view of a part of a wound electrode body illustrated in FIG. 1.

For example, as illustrated in FIG. 4, the positive electrode 21 has a structure in which positive electrode active material layers 21B are disposed on both surfaces of a positive electrode current collector 21A. Note that the positive electrode active material layer 21B may be disposed only on one surface of the positive electrode current collector 21A although not illustrated. For example, the positive electrode current collector 21A is constituted by a metal foil such as an aluminum foil, a nickel foil, or a stainless steel foil. For example, the positive electrode active material layer 21B contains a positive electrode active material capable of occluding and releasing lithium (Li) which is an electrode reactant. The positive electrode active material layer 21B may further contain an additive, if necessary. As the additive, for example, at least one of a conductive agent and a binder can be used.

(Positive Electrode Active Material)

As the positive electrode active material, for example, a lithium-containing compound such as a lithium oxide, a lithium phosphorus oxide, a lithium sulfide, or a lithium-containing interlayer compound may be suitably used, and two or more kinds thereof may be mixed and used. In order to increase an energy density, a lithium-containing compound containing lithium, a transition metal element, and oxygen (O) is preferable. Examples of such a lithium-containing compound include a lithium composite oxide having a layered rock-salt type structure illustrated in formula (A), and a lithium composite phosphate having an olivine type structure illustrated in formula (B). The lithium-containing compound more preferably contains at least one selected from the group consisting of cobalt (Co), nickel (Ni), manganese (Mn), and iron (Fe) as a transition metal element. Examples of such a lithium-containing compound include a lithium composite oxide having a layered rock-salt type structure represented by formula (C), (D), or (E), a lithium composite oxide having a spinel type structure represented by formula (F), and a lithium complex phosphate having an olivine type structure represented by formula (G). Specific examples thereof include $LiNi_{0.50}Co_{0.20}Mn_{0.30}O_2$, $Li_aCoO_2$ (a≈1), $Li_bNiO_2$ (b≈1), $Li_{c1}Ni_{c2}CO_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qMi_rO_{(2-y)}X_z \quad (A)$$

(In formula (A), M1 represents at least one element selected from Group 2 to Group 15 excluding nickel (Ni) and manganese (Mn). X represents at least one of a group 16 element and a group 17 element other than oxygen (O). p, q, y, and z are values within ranges of 0≤p≤1.5, 0≤q≤1.0, 0≤r≤1.0, −0.10≤y≤0.20, and 0≤z≤0.2.)

$$Li_aM2_bPO_4 \quad (B)$$

(In formula (B), M2 represents at least one element selected from Group 2 to Group 15. a and b are values within ranges of 0≤a≤2.0 and 0.5≤b≤2.0.)

(Provided that in formula (C), M3 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values within ranges of 0.8≤f≤1.2, 0<g<0.5, 0≤h≤0.5, g+h<1, −0.1≤j≤0.2, and 0≤k≤0.1. Note that a composition of lithium varies depending on a state of charge-discharge, and a value of f represents a value in a fully discharged state.)

(Provided that in formula (D), M4 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values within ranges of 0.8≤m≤1.2, 0.005≤n≤0.5, −0.1≤p≤0.2, and 0≤q≤0.1. Note that a composition of lithium varies depending on a state of charge-discharge, and a value of m represents a value in a fully discharged state.)

(Provided that in formula (E), M5 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u are values within ranges of 0.8≤r≤1.2, 0≤s<0.5, −0.1≤t≤0.2, and 0≤u≤0.1. Note that a composition of lithium varies depending on a state of charge-discharge, and a value of r represents a value in a fully discharged state.)

(Provided that in formula (F), M6 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values within ranges of 0.9≤v≤1.1, 0≤w≤0.6, 3.7≤x≤4.1, and 0≤y≤0.1. Note that a composition of lithium varies depending on a state of charge-discharge, and a value of v represents a value in a fully discharged state.)

(Provided that in formula (G), M7 represents at least one selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value within a range of 0.9≤z≤1.1. Note that a composition of lithium varies depending on a state of charge-discharge, and a value of z represents a value in a fully discharged state.)

The lithium-containing compound containing nickel (Ni) preferably has a Ni content of 80% or more. This is because the Ni content of 80% or more makes it possible to obtain a high battery capacity. Use of such a lithium-containing compound having a high Ni content makes the battery capacity high as described above, but makes the amount of gas generation (oxygen release amount) in the positive electrode 21 very large when abnormal heat is applied. The battery according to the first embodiment exhibits a particularly excellent safety improvement effect in a case where such an electrode with the large amount of gas generation is used.

The lithium-containing compound having a Ni content of 80% or more is preferably a positive electrode material represented by formula (H).

$Li_vNi_wM8_xM9_yO_z$ (H)

(In the formula, $0<v<2$, $w+x+y\le1$, $0.8\le w\le1$, $0\le x\le0.2$, $0\le y\le0.2$, and $0<z<3$ are satisfied, and each of M8 and M9 represents at least one selected from cobalt (Co), iron (Fe), manganese (Mn), copper (Cu), zinc (Zn), aluminum (Al), chromium (Cr), vanadium (V), titanium (Ti), magnesium (Mg), and zirconium (Zr).)

Other examples of the positive electrode material capable of occluding and releasing lithium include an inorganic compound containing no lithium, such as $MnO_2$, $V_2O_5$, $V_5O_{13}$, NiS, or MoS.

The positive electrode material capable of occluding and releasing lithium may be a material other than the materials described above. In addition, two or more kinds of the positive electrode materials exemplified above may be mixed in any combination.

(Binder)

As a binding material, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC), a copolymer mainly containing these resin materials, and the like is used.

(Conductive Agent)

Examples of the conductive agent include a carbon material such as graphite, carbon black, or Ketjen black. These materials are used singly or in mixture of two or more kinds thereof. Furthermore, in addition to the carbon material, a metal material, a conductive polymer material, or the like may be used as long as having conductivity.

(Negative Electrode)

For example, as illustrated in FIG. 4, the negative electrode 22 has a structure in which negative electrode active material layers 22B are disposed on both surfaces of a negative electrode current collector 22A. Note that the negative electrode active material layer 22B may be disposed only on one surface of the negative electrode current collector 22A although not illustrated. For example, the negative electrode current collector 22A is constituted by a metal foil such as a copper foil, a nickel foil, or a stainless steel foil.

The negative electrode active material layer 22B contains one or more kinds of negative electrode materials capable of occluding and releasing lithium as a negative electrode active material. The negative electrode active material layer 22B may further contain an additive such as a binder, if necessary.

Note that, in the battery according to the first embodiment, an electrochemical equivalent of a negative electrode material capable of occluding and releasing lithium is larger than that of the positive electrode 21, and a lithium metal is not precipitated on the negative electrode 22 during charging.

Examples of the negative electrode material capable of occluding and releasing lithium include a material capable of occluding and releasing lithium and containing at least one of metal elements and metalloid elements as a constituent element. Here, the negative electrode 22 containing such a negative electrode material is referred to as an alloy-based negative electrode. This is because use of such a material makes it possible to obtain a high energy density. Particularly, use of such a material together with a carbon material is more preferable because a high energy density and an excellent cycle characteristic can be obtained simultaneously. This negative electrode material may be a simple substance of a metal element or a metalloid element, an alloy thereof, or a compound thereof, and may partially contain one or more kinds of phases thereof. Incidentally, in the present technology, the alloy includes an alloy constituted by one or more kinds of metal elements and one or more kinds of metalloid elements in addition to an alloy constituted by two or more kinds of metal elements. In addition, a nonmetallic element may be contained. A structure thereof includes a solid solution, a eutectic (eutectic mixture), an intermetallic compound, and coexistence of two or more kinds thereof.

Examples of the metal element or the metalloid element constituting the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These elements maybe crystalline or amorphous.

Among these elements, as this negative electrode material, an element containing a metal element or a metalloid element of Group 4B in the short period periodic table as a constituent element is preferable, and an element containing at least one of (Si) and tin (Sn) as a constituent element is particularly preferable. This is because silicon (Si) and tin (Sn) have a high ability to occlude and release lithium (Li), and a high energy density can be obtained.

Examples of an alloy of tin (Sn) include an alloy containing at least one of the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than tin (Sn). Examples of an alloy of silicon (Si) include an alloy containing at least one of the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than silicon (Si).

Examples of a compound of tin (Sn) or a compound of silicon (Si) include a compound containing oxygen (O) or carbon (C). The compound of tin (Sn) or the compound of silicon (Si) may contain the above second constituent element in addition to tin (Sn) or silicon (Si). Specific examples of the compound of tin (Sn) include a silicon oxide represented by $SiO_v$ ($0.2<v<1.4$).

Examples of the negative electrode material capable of occluding and releasing lithium include a carbon material such as hardly graphitizable carbon, easily graphitizable carbon, graphite, pyrolytic carbon, coke, glassy carbon, an organic polymer compound fired body, carbon fiber, or activated carbon. Preferable examples of the graphite include natural graphite subjected to a spheroidization treatment or the like, and substantially spherical artificial graphite. Preferable examples of the artificial graphite include artificial graphite obtained by graphitizing mesocarbon microbeads (MCMB) and artificial graphite obtained by graphitizing and grinding coke raw materials. Examples of the coke include pitch coke, needle coke, and petroleum coke. The organic polymer compound fired body is obtained by firing a polymer material such as a phenol resin or a furan resin at an appropriate temperature to be carbonized. Some organic polymer compound fired bodies are classified into hardly graphitizable carbon or easily graphitizable carbon.

In addition, examples of the polymer material include polyacetylene and polypyrrole. These carbon materials are preferable because a change in a crystal structure occurring during charging and discharging is very small, a high charge-discharge capacity can be obtained, and an excellent cycle characteristic can be obtained. Particularly, graphite is preferable because a high energy density can be obtained due to a large electrochemical equivalent thereof. In addition, the hardly graphitizable carbon is preferable because an excellent characteristic can be obtained. Furthermore, a material having a low charge-discharge potential, specifically having a charge-discharge potential close to a lithium metal is preferable because a high energy density of a battery can be realized easily.

Other examples of the negative electrode material capable of occluding and releasing lithium include other metal compounds and a polymer material. Examples of the other metal compounds include an oxide such as $MnO_2$, $V_2O_5$, or $V_6O_{13}$, a sulfide such as NiS or MoS, and a lithium nitride such as $LiN_3$. Examples of the polymer material include polyacetylene, polyaniline, and polypyrrole.

(Binder)

As the binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC), a copolymer mainly containing these resin materials, and the like is used.

(Separator)

The separator 23 isolates the positive electrode 21 and the negative electrode 22 from each other to prevent short circuit of a current due to contact between both the electrodes, and allows a lithium ion to pass therethrough. For example, the separator 23 is constituted by a synthetic resin porous film constituted by polytetrafluoroethylene, polypropylene, polyethylene, or the like, or a ceramic porous film, and may have a structure obtained by stacking two or more kinds of these porous films. Among these films, a polyolefin porous film is preferable because the polyolefin porous film exhibits an excellent effect for preventing short circuit, and can improve safety of a battery due to a shutdown effect. Particularly, polyethylene is preferable as a material constituting the separator 23 because polyethylene can obtain a shutdown effect within a range of 100° C. or higher and 160° C. or lower and has excellent electrochemical stability. In addition, polypropylene is preferable. Furthermore, a resin having chemical stability can be used by copolymerizing the resin with polyethylene or polypropylene or blending the resin with polyethylene or polypropylene.

(Electrolytic Solution)

The separator 23 is impregnated with an electrolytic solution which is a liquid electrolyte. The electrolytic solution contains a solvent and an electrolyte salt dissolved in this solvent. The electrolytic solution may contain a known additive in order to improve a battery characteristic.

As the solvent, a cyclic carbonate such as ethylene carbonate or propylene carbonate can be used. It is preferable to use one of ethylene carbonate and propylene carbonate, and particularly preferable to mix and use both thereof. This is because a cycle characteristic can be improved.

In addition, as the solvent, it is preferable to mix and use chain carbonates such as diethyl carbonate, dimethyl carbonate, ethylmethyl carbonate, and methyl propyl carbonate in addition to these cyclic carbonates. This is because a high ionic conductivity can be obtained.

The solvent preferably further contains 2,4-difluoro anisole or vinylene carbonate. This is because 2,4-difluoro anisole can improve a discharge capacity, and vinylene carbonate can improve a cycle characteristic. Therefore, use of these compounds in mixture thereof is preferable because the discharge capacity and the cycle characteristic can be improved.

In addition to these compounds, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3 dioxolane, methyl acetate, methyl propionate, acetonitrile, glutaronitrile, adiponitrile, methoxy acetonitrile, 3-methoxy propylonitrile, N,N-dimethylformamide, N-methylpyrrolidinone, N-methyl-oxazolidinone, N,N-dimethyl imidazolidinone, nitromethane, nitroethane, sulfolane, dimethyl sulfoxide, and trimethyl phosphate.

Incidentally, a compound obtained by replacing at least a part of hydrogen atoms in these non-aqueous solvents with a fluorine atom may be preferable because the compound may improve reversibility of an electrode reaction with some types of combined electrodes.

Examples of the electrolyte salt include a lithium salt. The lithium salt can be used singly or in mixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro [oxalate —O,O'] lithium borate, lithium bisoxalate borate, and LiBr. Among these lithium salts, $LiPF_6$ is preferable because $LiPF_6$ can obtain a high ionic conductivity and can improve a cycle characteristic.

In the battery having the above configuration, when charging is performed, for example, a lithium ion is released from the positive electrode active material layer 21B, and is occluded by the negative electrode active material layer 22B through an electrolytic solution. In addition, when discharging is performed, for example, a lithium ion is released from the negative electrode active material layer 22B, and is occluded by the positive electrode active material layer 21B through an electrolytic solution.

[Function of Battery]

Figure 5:
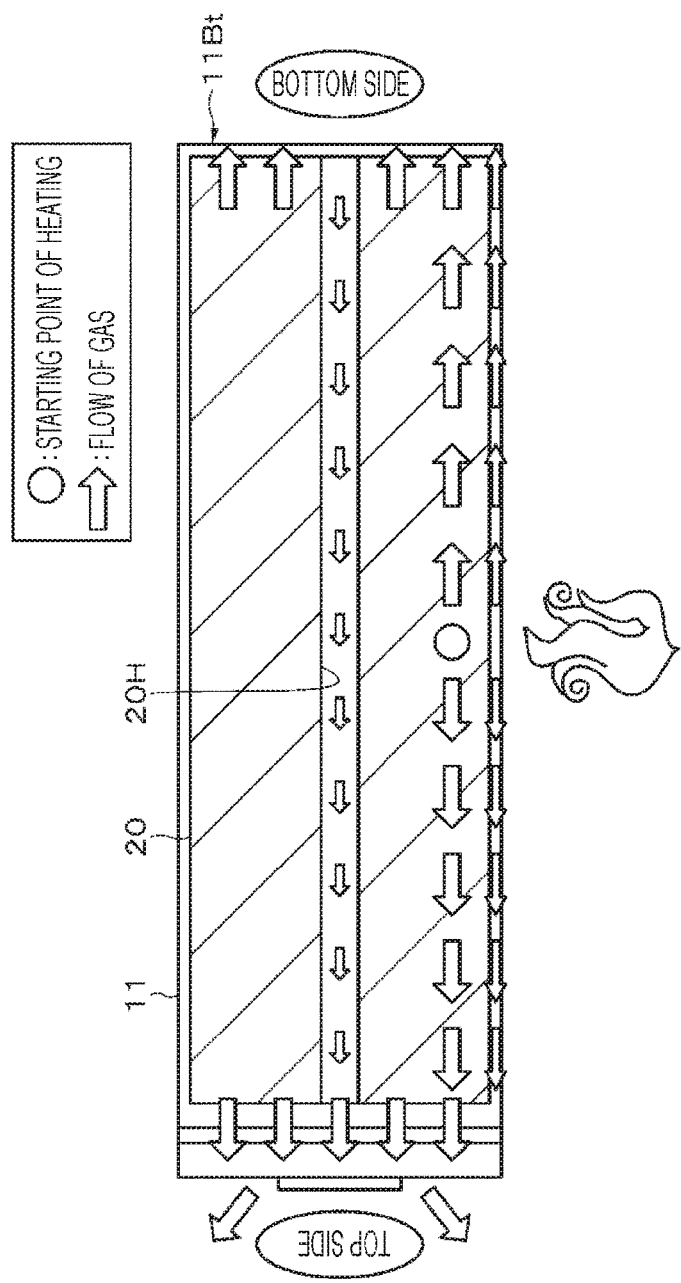
FIG. 5 is a schematic diagram for explaining a flow of generated gas when abnormal heat is applied to a battery.

In the battery having the above configuration, when abnormal heat is externally applied to the battery, as illustrated in FIG. 5, gas is generated from a heating portion, the vicinity thereof, and the like in the electrode, and the generated gas flows to a top side and a bottom side of the battery. The gas which has flowed to the top side is discharged to an outside via a safety valve mechanism which has cleaved (not illustrated). Meanwhile, the gas which has flowed to the bottom side goes around to the top side via the center hole 20H of the wound electrode body 20 and is discharged to an outside via the safety valve mechanism 15 which has cleaved.

In a case where the amount of generated gas is small and the center hole 20H of the wound electrode body 20 has a sufficient size, the gas which has flowed to the bottom side smoothly can go around to the top side, and can be discharged to an outside via the safety valve mechanism 15 which has cleaved. Therefore, a gas pressure on the bottom side of the battery is hardly abnormally increased. Meanwhile, in a case where the amount of generated gas is large and the center hole 20H of the wound electrode body 20 does not have a sufficient size, the amount of gas flowing to the bottom side increases, and it is difficult for the gas which has flowed to the bottom side to smoothly go around to the top side via the center hole 20H. Therefore, a gas pressure on the bottom side of the battery easily increases abnormally. Particularly, in a battery with high capacity and high output in an overcharged state, a gas pressure easily increases abnormally on the bottom side of the battery.

In the battery having the above configuration, the groove 11Gv cleaves appropriately in response to an abnormally increased gas pressure on the bottom side, and gas accumulated in the can bottom 11Bt can be discharged. At this time, gas accumulated in the can bottom 11Bt can be discharged from the can bottom 11Bt while jumping of the contents of the battery out of the can bottom 11Bt which has cleaved is suppressed.

[Method for Manufacturing Battery]

Next, a method for manufacturing the battery according to the first embodiment of the present technology will be exemplified.

First, for example, a first positive electrode active material, a second positive electrode active material, a conductive agent, and a binder are mixed to prepare a positive electrode mixture, and this positive electrode mixture is dispersed in a solvent such as N-methyl-2-pyrrolidone (NMP) to manufacture a paste-like positive electrode mixture slurry. Subsequently, this positive electrode mixture slurry is applied to the positive electrode current collector 21A, the solvent is dried, and the resulting product is subjected to compression molding with a roll press machine or the like to form the positive electrode active material layer 21B and form the positive electrode 21.

In addition, for example, a negative electrode active material and a binder are mixed to prepare a negative electrode mixture, and this negative electrode mixture is dispersed in a solvent such as N-methyl-2-pyrrolidone to manufacture a paste-like negative electrode mixture slurry. Subsequently, this negative electrode mixture slurry is applied to the negative electrode current collector 22A, the solvent is dried, and the resulting product is subjected to compression molding with a roll press machine or the like to form the negative electrode active material layer 22B and form the negative electrode 22.

Subsequently, the positive electrode lead 25 is attached to the positive electrode current collector 21A by welding or the like, and the negative electrode lead 26 is attached to the negative electrode current collector 22A by welding or the like. Subsequently, the positive electrode 21 and the negative electrode 22 are wound through the separator 23. Subsequently, an end of the positive electrode lead 25 is welded to the safety valve mechanism 15, and an end of the negative electrode lead 26 is welded to the battery can 11. The wound positive electrode 21 and negative electrode 22 are sandwiched by the pair of insulating plates 12 and 13, and are housed in the battery can 11. Subsequently, the positive electrode 21 and the negative electrode 22 are housed in the battery can 11. Thereafter, the electrolytic solution is injected into the battery can 11, and the separator 23 is impregnated therewith. Subsequently, the battery lid 14, the safety valve mechanism 15, and the positive temperature coefficient element 16 are fixed to an open end of the battery can 11 by being crimped through the sealing gasket 17. The secondary battery illustrated in FIG. 1 is thereby obtained.

[Effect]

According to the above first embodiment, the inner surface of the can bottom 11Bt has the arc-shaped groove 11Gv. In addition, the opening angle θ of the groove 11Gv with respect to a center of the arc is 0.5 degrees or more and 56 degrees or less. The ratio Ra of the inner diameter $R_{in}$ of the groove 11Gv with respect to the outer diameter $R_{out}$ of the can bottom 11Bt is 44% or more and 77% or less. As a result, when abnormal heat is applied to a battery in an overcharged state or the like, the groove 11Gv appropriately cleaves in accordance with an abnormal increase in the gas pressure in the battery can 11 in order to prevent the contents of the battery from jumping out of the battery can 11, and rupture of the battery can be suppressed. In addition, when a battery in an overcharged state or the like drops, the groove 11Gv cleaves due to an impact of drop, and it is also possible to suppress jumping of the contents of the battery out of the battery can 11. Therefore, it is possible to improve safety when abnormal heat is applied to a battery in an overcharged state or the like while a decrease in mechanical strength (that is, cleavage strength of the groove 11Gv) of the can bottom 11Bt of the battery can 11 is suppressed.

As described above, the center pin 24 has a tubular shape, and functions as a flow path for guiding generated gas from the bottom side of the battery to the top side at the time of gas generation. If the center pin 24 is disposed, crushing of the center hole 20H of the wound electrode body 20 can be suppressed. However, the center pin 24 is crushed by expansion of the wound electrode body 20, the center hole 20H of the wound electrode body 20 does not have a sufficient size, and a gas pressure on the bottom side may abnormally increase. Particularly, in a battery with high capacity and high output, the wound electrode body 20 is largely expanded at the time of charging and discharging or application of abnormal heat. Therefore, the center hole 20H of the wound electrode body 20 easily loses a sufficient size, and therefore a gas pressure on the bottom side easily increases abnormally. Therefore, regardless of presence or absence of the center pin 24, it is effective to dispose the arc-shaped groove 11Gv in the can bottom 11Bt as described above for improving safety of the battery.

Modification Example

Of both surfaces of the can bottom 11Bt, a surface outside the battery can 11 (hereinafter, simply referred to as an "outer surface of the can bottom 11Bt") may have the arc-shaped groove 11Gv as illustrated in FIG. 6A. Furthermore, as illustrated in FIG. 6B, each of the inner surface and the outer surface of the can bottom 11Bt may have the arc-shaped groove 11Gv. However, the groove 11Gv is preferably disposed on the inner surface of the can bottom 11Bt as in the first embodiment from a viewpoint of suppressing corrosion of the groove 11Gv due to outside air.

FIG. 6B illustrates an example in which the grooves 11Gv disposed on the inner surface and the outer surface overlap each other in a thickness direction of the can bottom 11Bt. However, the grooves 11Gv disposed on the inner surface and the outer surface may be disposed so as to be deviated in an in-plane direction of the can bottom 11Bt while the grooves 11Gv do not overlap each other in the thickness direction of the can bottom 11Bt.

In the first embodiment described above, the battery having the center pin 24 has been described, but a battery without the center pin 24 may be used. In a battery having such a configuration, the center hole 20H of the wound electrode body 20 tends to have an insufficient size due to expansion of the wound electrode body 20, and therefore an effect of improving safety by the groove 11Gv is remarkably exhibited.

2. Second Embodiment

In a second embodiment, a battery pack and an electronic device each including the battery according to the first embodiment will be described.

[Configurations of Battery Pack and Electronic Device]

Figure 7:
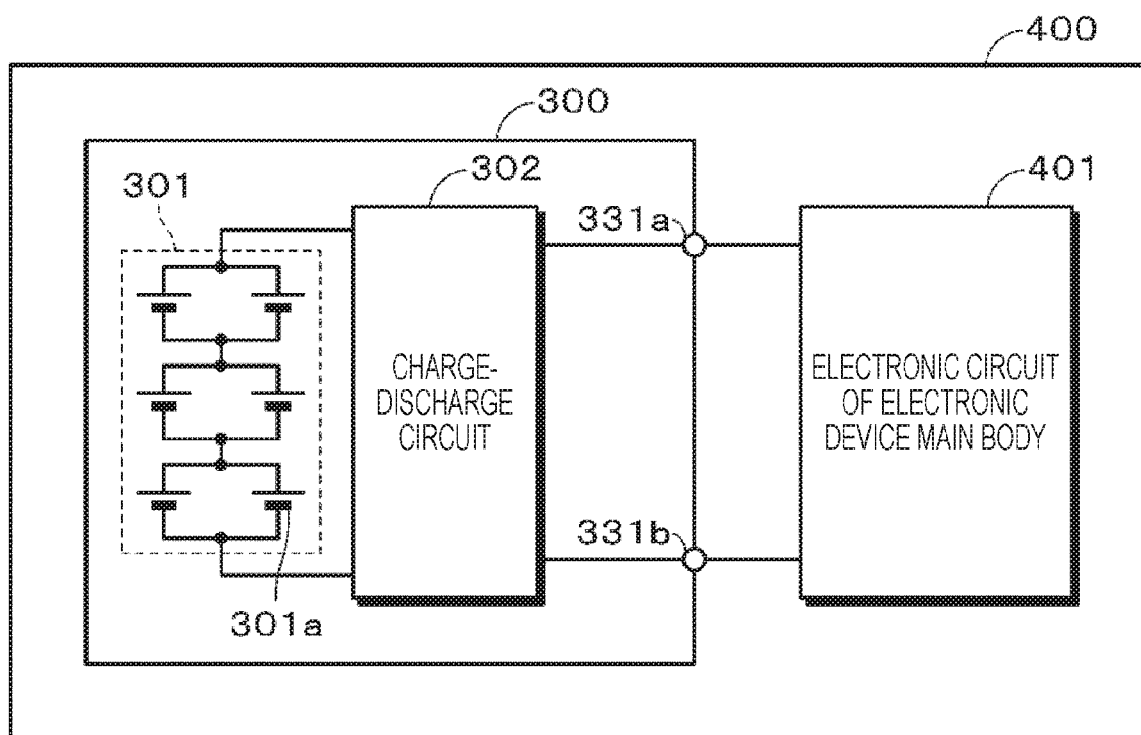
FIG. 7 is a block diagram illustrating a configuration example of an electronic device according to a second embodiment of the present technology.

Hereinafter, configuration examples of a battery pack 300 and an electronic device 400 according to the second embodiment of the present technology will be described with reference to FIG. 7. The electronic device 400 includes an electronic circuit 401 of an electronic device main body and the battery pack 300. The battery pack 300 is electrically connected to the electronic circuit 401 through a positive electrode terminal 331*a* and a negative electrode terminal 331*b*. For example, in the electronic device 400, the battery pack 300 is attachable and removable by a user. Note that the structure of the electronic device 400 is not limited thereto, but the battery pack 300 may be incorporated in the electronic device 400 such that a user cannot remove the battery pack 300 from the electronic device 400.

During charging of the battery pack 300, the positive electrode terminal 331*a* of the battery pack 300 and the negative electrode terminal 331*b* thereof are connected to a positive electrode terminal of a charger (not illustrated) and a negative electrode terminal thereof, respectively. On the other hand, during discharging of the battery pack 300 (during use of the electronic device 400), the positive electrode terminal 331*a* of the battery pack 300 and the negative electrode terminal 331*b* thereof are connected to a positive electrode terminal of the electronic circuit 401 and a negative electrode terminal thereof, respectively.

Examples of the electronic device 400 include a notebook personal computer, a tablet computer, a mobile phone (for example, a smart phone), a personal digital assistant (PDA), a display device (LCD, an EL display, electronic paper, or the like), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device 400 is not limited thereto.

(Electronic Device)

For example, the electronic circuit 401 includes CPU, a peripheral logic unit, an interface unit, and a storage unit, and controls the entire electronic device 400.

(Battery Pack)

The battery pack 300 includes an assembled battery 301 and a charge-discharge circuit 302. The assembled battery 301 is formed by connecting a plurality of secondary batteries 301*a* to each other in series or in parallel. For example, the plurality of secondary batteries 301*a* is connected to each other in n parallel m series (each of n and m is a positive integer). Note that FIG. 7 illustrates an example in which six secondary batteries 301*a* are connected to each other in 2 parallel 3 series (2P3S). As the secondary battery 301*a*, the battery according to the first embodiment is used.

The charge-discharge circuit 302 is a control unit for controlling charge-discharge of the assembled battery 301. Specifically, during charging, the charge-discharge circuit 302 controls charging to the assembled battery 301. Meanwhile, during discharging (that is, during use of the electronic device 400), the charge-discharge circuit 302 controls discharging to the electronic device 400.

Modification Example

In the second embodiment described above, the case where the battery pack 300 includes the assembled battery 301 including the plurality of secondary batteries 301*a* has been exemplified. However, a configuration in which the battery pack 300 includes one secondary battery 301*a* in place of the assembled battery 301 may be adopted.

3. Third Embodiment

In a third embodiment, an electricity storage system including the battery according to the first embodiment in an electricity storage device will be described. This electricity storage system may be any system as long as using electric power, and includes a simple electric power device. Examples of this electric power system include a smart grid, a home energy management system (HEMS), and a vehicle. The electric power system can also store electricity.

[Configuration of Electricity Storage System]

Figure 8:
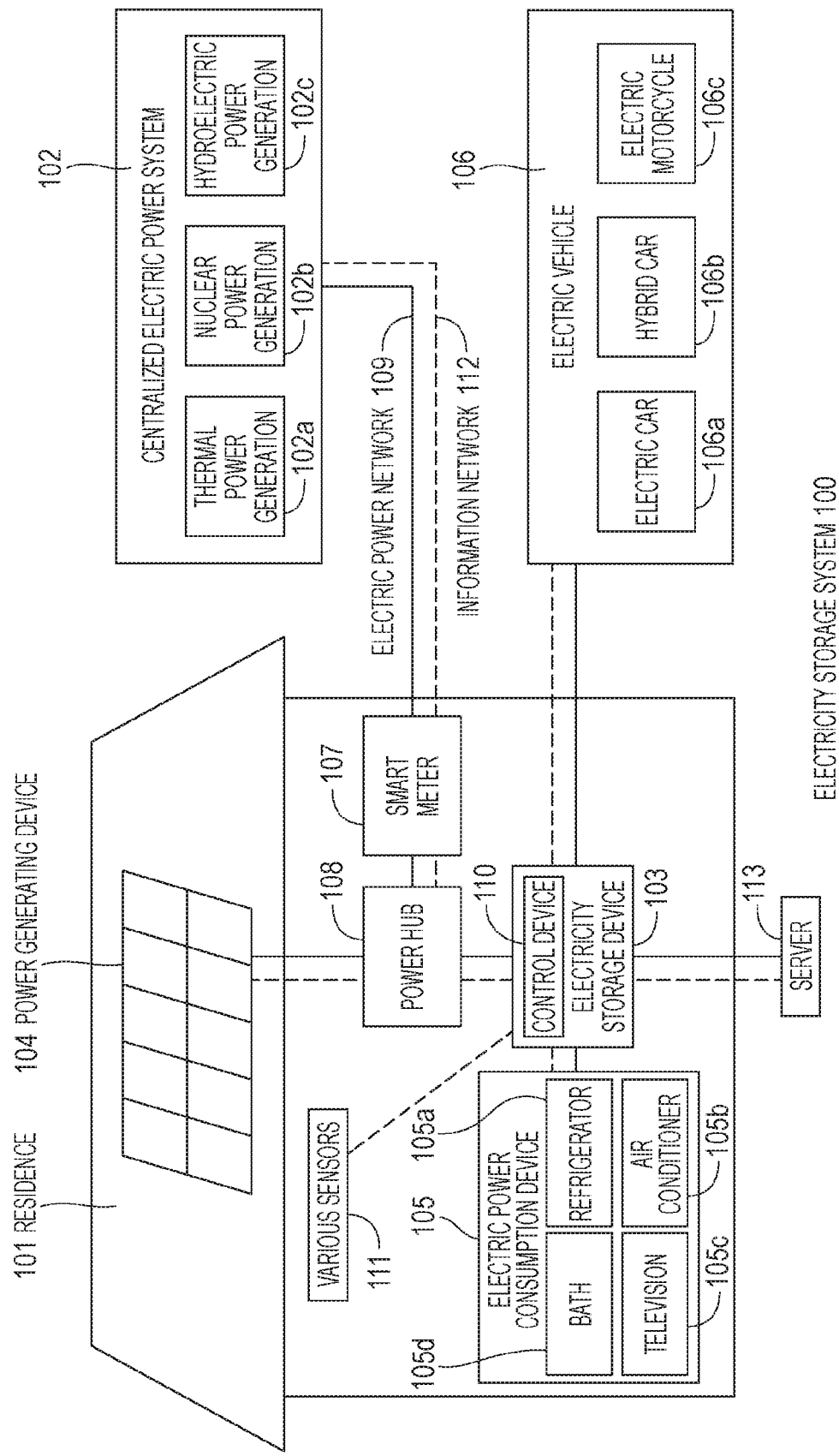
FIG. 8 is a schematic diagram illustrating a configuration example of an electricity storage system according to a third embodiment of the present technology.

Hereinafter, a configuration example of an electricity storage system (electric power system) 100 according to the third embodiment will be described with reference to FIG. 8. The electricity storage system 100 is a residential electricity storage system, and electric power is supplied from a centralized electric power system 102 such as thermal power generation 102*a*, nuclear power generation 102*b*, or hydroelectric power generation 102*c* to an electricity storage device 103 via an electric power network 109, an information network 112, a smart meter 107, a power hub 108, or the like. At the same time, electric power is supplied from an independent power source such as a home power generating device 104 to the electricity storage device 103. Electric power supplied to the electricity storage device 103 is stored. Electric power used in a residence 101 is supplied using the electricity storage device 103. Not only the residence 101 but also a building can use a similar electricity storage system.

The residence 101 is provided with the home power generating device 104, an electric power consumption device 105, the electricity storage device 103, a control device 110 for controlling devices, the smart meter 107, the power hub 108, and a sensor 111 for acquiring various information. The devices are connected to each other via the electric power network 109 and the information network 112. As the home power generating device 104, a solar cell, a fuel cell, or the like is used, and generated electric power is supplied to the electric power consumption device 105 and/or the electricity storage device 103. The electric power consumption device 105 is a refrigerator 105*a*, an air conditioner 105*b*, a television receiver 105*c*, a bath 105*d*, or the like. Furthermore, the electric power consumption device 105 further includes an electric vehicle 106. The electric vehicle 106 is an electric car 106*a*, a hybrid car 106*b*, an electric motorcycle 106*c*, or the like.

The electricity storage device 103 includes the battery according to the first embodiment. The smart meter 107 measures a use amount of commercial electric power, and transmits the measured use amount to an electric power company. The electric power network 109 may be any one of DC power supply, AC power supply, and non-contact power supply, or a combination of two or more thereof.

Examples of the various sensors 111 include a human sensor, an illuminance sensor, an object detection sensor, a consumed electric power sensor, a vibration sensor, a contact sensor, a temperature sensor, and an infrared sensor. Information acquired by the various sensors 111 is transmitted to the control device 110. A weather condition, a human condition, or the like is understood due to the Information from the sensors 111, and energy consumption can be minimized by automatic control of the electric power consumption device 105. Furthermore, the control device 110 can transmit information regarding the residence 101 to an external electric power company or the like via internet.

The power hub 108 performs processing such as branching of an electric power line or DC-AC conversion. A communication method of the information network 112 connected to the control device 110 includes a method of using a communication interface such as universal asynchronous receiver-transceiver (UART) and a method of using a sensor network by a wireless communication standard, such as Bluetooth (registered trademark), ZigBee, or Wi-Fi. The Bluetooth (registered trademark) method is applied to multimedia communication and perform one-to-many communication. ZigBee uses a physical layer of IEEE (Institute of Electrical and Electronics Engineers) 802.15.4. IEEE802.15.4 is a name of a short-distance wireless network standard called personal area network (PAN) or wireless (W) PAN.

The control device 110 is connected to an external server 113. This server 113 may be managed by any one of the residence 101, an electric power company, and a service provider. For example, information transmitted or received by the server 113 is consumption electric power information, life pattern information, electric power charge, weather information, natural disaster information, or information regarding electric power transaction. A home electric power consumption device (for example, a television receiver) may transmit or receive the information, but an outside-home device (for example, a mobile phone) may transmit or receive the information. A device having a display function, such as a television receiver, a mobile phone, or a personal digital assistant (PDA), may display the information.

The control device 110 for controlling units is constituted by a central processing unit (CPU), a random access memory (RAM), a read only memory (ROM), and the like, and is housed in the electricity storage device 103 in this example. The control device 110 is connected to the electricity storage device 103, the home power generating device 104, the electric power consumption device 105, the various sensors 111, and the server 113 via the information network 112, and for example, adjusts a use amount of commercial electric power and a power generation amount. Note that the control device 110 may perform electric power transaction in an electric power market or the like.

As described above, the electricity storage device 103 can store not only electric power from the centralized electric power system 102 such as the thermal power generation 102a, the nuclear power generation 102b, or the hydroelectric power generation 102c but also electric power generated by the home power generating device 104 (solar power generation or wind power generation). Therefore, even when the electric power generated by the home power generating device 104 fluctuates, control for keeping the amount of electric power to be sent to an outside constant or discharging by a necessary amount of electric power can be performed. For example, the following method of use is possible. That is, electric power obtained by solar power generation is stored in the electricity storage device 103, midnight electric power the charge of which is low at night is stored in the electricity storage device 103, and electric power stored in the electricity storage device 103 is used by discharging in daytime in which electric power charge is high.

Note that, in this example, the control device 110 housed in the electricity storage device 103 has been exemplified, but the control device 110 may be housed in the smart meter 107, or may be formed alone. Furthermore, the electricity storage system 100 may be used for a plurality of homes in a multiple dwelling house or a plurality of detached houses.

4. Fourth Embodiment

In a fourth embodiment, an electric vehicle including the battery according to the first embodiment will be described.

[Configuration of Electric Vehicle]

Figure 9:
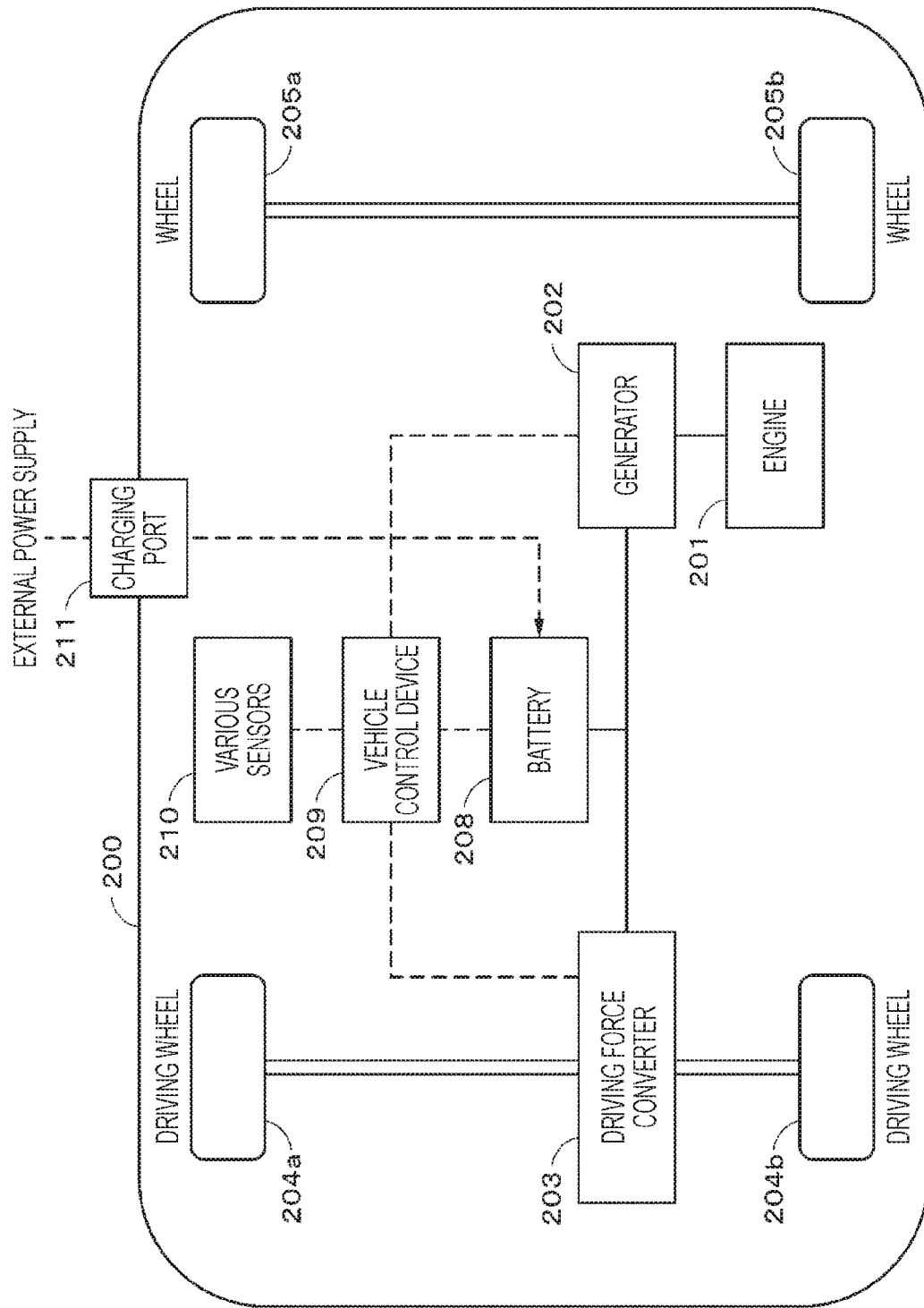
FIG. 9 is a schematic diagram illustrating a configuration example of an electric vehicle according to a fourth embodiment of the present technology.

Hereinafter, a configuration example of the electric vehicle according to the fourth embodiment of the present technology will be described with reference to FIG. 9. A hybrid vehicle 200 is a hybrid vehicle using a series hybrid system. The series hybrid system is a car traveling with an electric power driving force converter 203 using electric power generated by a generator driven by an engine or electric power obtained by temporarily storing the generated electric power in a battery.

An engine 201, a generator 202, the electric power driving force converter 203, a driving wheel 204a, a driving wheel 204b, a wheel 205a, a wheel 205b, a battery 208, a vehicle control device 209, various sensors 210, and a charging port 211 are mounted in this hybrid vehicle 200. As the battery 208, the battery according to the first embodiment is used.

The hybrid vehicle 200 travels using the electric power driving force converter 203 as a power source. An example of the electric power driving force converter 203 is a motor. The electric power driving force converter 203 acts by electric power of the battery 208, and a rotating force of the electric power driving force converter 203 is transmitted to the driving wheels 204a and 204b. Note that the electric power driving force converter 203 can be applied to both an AC motor and a DC motor by using DC-AC or reverse conversion (AC-DC conversion) at necessary portions. The various sensors 210 control an engine speed through the vehicle control device 209, or control an opening degree (throttle opening degree) of a throttle valve (not illustrated). The various sensors 210 include a velocity sensor, an acceleration sensor, an engine speed sensor, and the like.

A rotating force of the engine 201 is transmitted to the generator 202, and electric power generated by the generator 202 can be stored in the battery 208 by the rotating force.

When the hybrid vehicle 200 is decelerated by a brake mechanism (not illustrated), a resistance force during the deceleration is added to the electric power driving force converter 203 as a rotating force, and regenerative electric power generated by the electric power driving force converter 203 due to this rotating force is stored in the battery 208.

By being connected to an external power source of the hybrid vehicle 200 through the charging port 211, the battery 208 receives electric power from the external power source by using the charging port 211 as an input port, and can store the received electric power.

Although not illustrated, an information processing device for performing information processing regarding vehicle control on the basis of information regarding a battery may be included. Examples of such an information processing device include an information processing device for displaying a battery remaining amount based on information regarding the battery remaining amount.

Note that the above description has been made by exemplifying a series hybrid car traveling with a motor using electric power generated by a generator driven by an engine or electric power obtained by temporarily storing the generated electric power in a battery. However, the present technology can be applied effectively also to a parallel hybrid car using both an engine and a motor as a driving source and appropriately switching three methods of traveling only by the engine, traveling only by the motor, and traveling by both the engine and the motor to be used. Furthermore, the present technology can be applied effectively also to a so-called electric vehicle traveling by driving only with a driving motor without use of an engine.

EXAMPLES

Hereinafter, the present technology will be described specifically with Examples, but the present technology is not limited only to these Examples.

Examples of the present technology will be described in the following order.
i Samples with ratio Ra and opening angle θ changed
ii Samples with thickness t of groove bottom or width w of groove changed
iii Samples with volume energy density changed i Samples with Ratio Ra and Opening Angle θ Changed Examples 1-1 to 1-3 and Comparative Examples 1-1 to 1-3

(Step of Manufacturing Positive Electrode)

A positive electrode was manufactured as follows. First, lithium carbonate ($Li_2CO_3$) and cobalt carbonate ($CoCO_3$) were mixed at a molar ratio of 0.5:1, and then the resulting mixture was calcined in air at 900° C. for 5 hours to obtain a lithium cobalt composite oxide ($LiCoO_2$) as a positive electrode active material. Subsequently, 91 parts by mass of the lithium cobalt composite oxide obtained as described above, 6 parts by mass of graphite as a conductive agent, and 3 parts by mass of polyvinylidene fluoride as a binder were mixed to obtain a positive electrode mixture. Thereafter, the positive electrode mixture was dispersed in N-methyl-2-pyrrolidone to obtain a paste-like positive electrode mixture slurry. Subsequently, the positive electrode mixture slurry was applied to both surfaces of a positive electrode current collector constituted by a strip-shaped aluminum foil (thickness of 12 μm), and was dried. Thereafter, the resulting product was compression-molded with a roll press machine to form a positive electrode active material layer. Subsequently, a positive electrode lead constituted by aluminum was welded and attached to one end of the positive electrode current collector.

(Step of Manufacturing Negative Electrode)

A negative electrode was manufactured as follows. First, 97 parts by mass of artificial graphite powder as a negative electrode active material and 3 parts by mass of polyvinylidene fluoride as a binder were mixed to obtain a negative electrode mixture. Thereafter, the negative electrode mixture was dispersed in N-methyl-2-pyrrolidone to obtain a paste-like negative electrode mixture slurry. Subsequently, the negative electrode mixture slurry was applied to both surfaces of a negative electrode current collector constituted by a strip-shaped copper foil (thickness of 15 μm), and was dried. Thereafter, the resulting product was compression-molded with a roll press machine to form a negative electrode active material layer. Subsequently, a negative electrode lead constituted by nickel was attached to one end of the negative electrode current collector.

(Step of Assembling Battery)

A battery was assembled as follows. First, the positive electrode and the negative electrode obtained as described above were stacked through a separator constituted by a microporous polyethylene stretched film having a thickness of 23 μm in order of the negative electrode, the separator, the positive electrode, and the separator, and the resulting stacked body was wound many times to obtain a jelly roll type wound electrode body.

Subsequently, a battery can with a can bottom having the following configuration was prepared.

Groove forming surface at can bottom: inner surface of can bottom
Groove shape: arc shape
Number of grooves: one
Outer diameter (diameter) of can bottom $R_{out}$: 18.20 mm
Inner diameter (diameter) of groove $R_{in}$: 4 mm to 16 mm
Ratio Ra (=($R_{in}/R_{out}$)×100): 22% to 88%
Opening angle θ of groove with respect to center of can bottom: 0.5 degrees
Thickness t of can bottom at bottom of groove: 0.075 mm
Width w of groove: 0.4 mm
Opening angle φ of slope of groove: 30 degrees
Volume energy density: 430 Wh/L Subsequently, the wound electrode body was sandwiched by a pair of insulating plates, the negative electrode lead was welded to the battery can, and the positive electrode lead was welded to the safety valve mechanism to house the wound electrode body inside the battery can. Subsequently, a non-aqueous electrolytic solution was prepared by dissolving $LiPF_6$ as an electrolyte salt in a solvent obtained by mixing ethylene carbonate and methylethyl carbonate at a volume ratio of 1:1 so as to have a concentration of 1 mol/dm$^3$.

Finally, an electrolytic solution was injected into the above battery can housing the wound electrode body. Thereafter, a safety valve, a PTC element, and a battery lid were fixed by crimping the battery can via an insulating sealing gasket to manufacture a cylindrical battery having an outer diameter (diameter) of 18.20 mm and a height of 65 mm. Note that this battery was designed to have an open circuit voltage (that is, battery voltage) of 4.2 V at the time of full charge by adjusting the amount of a positive electrode active material and the amount of a negative electrode active material. However, the battery was evaluated at 4.4 V (in an overcharged state exceeding a usual use range voltage) in a test described later.

Examples 2-1 to 2-3 and Comparative Examples 2-1 to 2-3

A battery was manufactured in a similar manner to Examples 1-1 to 1-3 and Comparative Examples 1-1 to 1-3 except that the opening angle θ of the groove with respect to the center of the can bottom was changed to 6 degrees.

Examples 3-1 to 3-3 and Comparative Examples 3-1 to 3-3

A battery was manufactured in a similar manner to Examples 1-1 to 1-3 and Comparative Examples 1-1 to 1-3 except that the opening angle θ of the groove with respect to the center of the can bottom was changed to 30 degrees.

Examples 4-1 to 4-3 and Comparative Examples 4-1 to 4-3

A battery was manufactured in a similar manner to Examples 1-1 to 1-3 and Comparative Examples 1-1 to 1-3 except that the opening angle θ of the groove with respect to the center of the can bottom was changed to 45 degrees.

Examples 5-1 to 5-3 and Comparative Examples 5-1 to 5-3

A battery was manufactured in a similar manner to Examples 1-1 to 1-3 and Comparative Examples 1-1 to 1-3 except that the opening angle θ of the groove with respect to the center of the can bottom was changed to 56 degrees.

Comparative Examples 6-1 to 6-6

A battery was manufactured in a similar manner to Examples 1-1 to 1-3 and Comparative Examples 1-1 to 1-3 except that the shape of the groove at the can bottom was changed from an arc shape to a circular shape (the opening angle θ of the groove with respect to the center of the can bottom=0 degrees).

Comparative Examples 7-1 to 7-6

A battery was manufactured in a similar manner to Examples 1-1 to 1-3 and Comparative Examples 1-1 to 1-3 except that the opening angle θ of the groove with respect to the center of the can bottom was changed to 80 degrees.

(Evaluation)

The batteries of Examples 1-1 to 5-3 and Comparative Examples 1-1 to 7-6 obtained as described above were subjected to the following battery burning test and battery drop test. Note that these tests are in conformity to public tests.

(Battery Burning Test)

First, batteries were charged so as to be in an overcharged state with an open circuit voltage of 4.4 V. Subsequently, the central portions of the charged batteries were burned with a burner, and the number of batteries in which the contents did not jump out of the batteries and did not rupture was counted. Subsequently, a passing ratio r1 of the battery burning test was determined from the following formula.

(Passing ratio r1 of battery burning test)=((Number of batteries in which the contents did not jump out of the batteries and did not rupture)/(Number of batteries subjected to burning test))×100 [%]

(Battery Drop Test)

First, batteries were charged so as to be in an overcharged state with an open circuit voltage of 4.4 V. Subsequently, the charged batteries were caused to drop thirty times from a height of 10 m, and the number of batteries in which the contents did not jump out of the batteries was counted. Subsequently, a passing ratio r2 of the battery drop test was determined from the following formula.

(Passing ratio r2 of battery drop test)=((Number of batteries in which the contents did not jump out of the batteries)/(Number of batteries subjected to drop test))×100[%]

Table 1 illustrates test results of the batteries of Examples 1-1 to 5-3 and Comparative Examples 1-1 to 7-6.

TABLE 1

|  | θ: 0° | θ: 0.5° | θ: 6° | θ: 30° | θ: 45° | θ: 56° | θ: 80° |
|---|---|---|---|---|---|---|---|
| Rin: 16 mm<br>Ra: 88% | (CEx. 6-1)<br>r1: 20%<br>(jumping out)<br>r2: 60% | (CEx. 1-1)<br>r1: 100%<br>r2: 60% | (CEx. 2-1)<br>r1: 100%<br>r2: 60% | (CEx. 3-1)<br>r1: 100%<br>r2: 60% | (CEx. 4-1)<br>r1: 100%<br>r2: 60% | (CEx. 5-1)<br>r1: 100%<br>r2: 60% | (CEx. 7-1)<br>r1: 80%<br>(rupture)<br>r2: 60% |
| Rin: 14 mm<br>Ra: 77% | (CEx. 6-2)<br>r1: 20%<br>(jumping out)<br>r2: 60% | (Ex. 1-1)<br>r1: 100%<br>r2: 100% | (Ex. 2-1)<br>r1: 100%<br>r2: 100% | (Ex. 3-1)<br>r1: 100%<br>r2: 100% | (Ex. 4-1)<br>r1: 100%<br>r2: 100% | (Ex. 5-1)<br>r1: 100%<br>r2: 100% | (CEx. 7-2)<br>r1: 80%<br>(rupture)<br>r2: 100% |
| Rin: 14 mm<br>Ra: 50% | (CEx. 6-3)<br>r1: 20%<br>(jumping out)<br>r2: 60% | (Ex. 1-2)<br>r1: 100%<br>r2: 100% | (Ex. 2-2)<br>r1: 100%<br>r2: 100% | (Ex. 3-2)<br>r1: 100%<br>r2: 100% | (Ex. 4-2)<br>r1: 100%<br>r2: 100% | (Ex. 5-2)<br>r1: 100%<br>r2: 100% | (CEx. 7-3)<br>r1: 80%<br>(rupture)<br>r2: 100% |
| Rin: 8 mm<br>Ra: 44% | (CEx. 6-4)<br>r1: 20%<br>(jumping out)<br>r2: 60% | (Ex. 1-3)<br>r1: 100%<br>r2: 100% | (Ex. 2-3)<br>r1: 100%<br>r2: 100% | (Ex. 3-3)<br>r1: 100%<br>r2: 100% | (Ex. 4-3)<br>r1: 100%<br>r2: 100% | (Ex. 5-3)<br>r1: 100%<br>r2: 100% | (CEx. 7-4)<br>r1: 80%<br>(rupture)<br>r2: 100% |
| Rin: 6 mm<br>Ra: 33% | (CEx. 6-5)<br>r1: 20%<br>(rupture)<br>r2: 80% | (CEx. 1-2)<br>r1: 80%<br>(rupture)<br>r2: 100% | (CEx. 2-2)<br>r1: 80%<br>(rupture)<br>r2: 100% | (CEx. 3-2)<br>r1: 80%<br>(rupture)<br>r2: 100% | (CEx. 4-2)<br>r1: 80%<br>(rupture)<br>r2: 100% | (CEx. 5-2)<br>r1: 80%<br>(rupture)<br>r2: 100% | (CEx. 7-5)<br>r1: 80%<br>(rupture)<br>r2: 100% |
| Rin: 4 mm<br>Ra: 22% | (CEx. 6-6)<br>r1: 20%<br>(rupture)<br>r2: 100% | (CEx. 1-3)<br>r1: 60%<br>(rupture)<br>r2: 100% | (CEx. 2-3)<br>r1: 60%<br>(rupture)<br>r2: 100% | (CEx. 3-3)<br>r1: 60%<br>(rupture)<br>r2: 100% | (CEx. 4-3)<br>r1: 60%<br>(rupture)<br>r2: 100% | (CEx. 5-3)<br>r1: 60%<br>(rupture)<br>r2: 100% | (CEx. 7-6)<br>r1: 60%<br>(rupture)<br>r2: 100% |

The symbols listed in Table 1 mean the following.

$R_{in}$: inner diameter of groove [mm]

Ra: ratio of inner diameter $R_{in}$ of groove with respect to outer diameter $R_{out}$ of can bottom [%]

θ: opening angle of groove with respect to center of can bottom [degree]

Ex.: Example

CEx.: Comparative Example r1: Passing ratio of battery burning test [%]

r2: Passing ratio of battery drop test [%]

Of the above test results, the test results of the batteries of Examples 1-2, 2-2, 3-2, 4-2, and 5-2, and Comparative Examples 6-3 and 7-3 are illustrated representatively in FIG. 10A. In addition, the test results of the batteries of Examples 2-1 to 2-3 and Comparative Examples 2-1 to 2-3 are illustrated representatively in FIG. 10B.

Table 1 and FIGS. 10A and 10B indicate the following.

If the opening angle θ is less than 0.5 degrees, the passing ratio of the burning test tends to decrease. This is because the whole groove portion of the can bottom opens at the time of the burning test due to the small opening angle θ, and the contents of the battery easily jump out. In addition, if the opening angle θ is less than 0.5 degrees, the passing ratio of the drop test tends to decrease. This is because the whole groove portion of the can bottom opens at the time of the drop test due to the small opening angle θ, and the contents of the battery easily jump out.

If the opening angle θ is more than 56 degrees, the passing ratio of the burning test tends to decrease. This is because an opening area of the can bottom is small at the time of the burning test due to the large opening angle θ, and the battery easily ruptures.

If the ratio Ra is less than 44%, the passing ratio of the burning test tends to decrease. This is because the groove is too far from an outer periphery of the can bottom, the groove is hardly softened due to heat generation at the time of the burning test, the can bottom does not cleave, and the battery easily ruptures.

If the ratio Ra is more than 77%, the passing ratio of the drop test tends to decrease. This is because the contents of the battery easily jump out due to a large opening area of the can bottom at the time of the drop test.

Therefore, in order to suppress a decrease in the passing ratios of the drop test and the burning test, the opening angle θ is 0.5 degrees or more and 56 degrees or less, and the ratio Ra is 44% or more and 77% or less.

ii Samples with Thickness t of Groove Bottom or Width w of Groove Changed

Examples 6-1 to 6-6

As illustrated in Table 2, a battery was obtained in a similar manner to Example 2-2 except that the thickness t of the groove bottom was changed within a range of 0.010 mm to 0.200 mm.

Examples 7-1 to 7-7

As illustrated in Table 3, a battery was obtained in a similar manner to Example 2-2 except that the width w of the groove was changed within a range of 0.05 mm to 2.00 mm.

(Evaluation)

The batteries of Examples 6-1 to 6-6 and 7-1 to 7-7 obtained as described above were subjected to a battery burning test and a battery drop test in a similar manner to Examples 1-1 to 5-3 and Comparative Examples 1-1 to 7-6 described above.

Table 2 and FIG. 11A illustrate test results of Examples 2-2 and 6-1 to 6-6.

TABLE 2

|  | thickness t of groove bottom [mm] | passing ratio of burning test [%] | passing ratio of drop test [%] |
|---|---|---|---|
| Example 2-2 | 0.075 | 100 | 100 |
| Example 6-1 | 0.010 | 100 | 60 |
| Example 6-2 | 0.020 | 100 | 100 |
| Example 6-3 | 0.050 | 100 | 100 |
| Example 6-4 | 0.100 | 100 | 100 |
| Example 6-5 | 0.150 | 100 | 100 |
| Example 6-6 | 0.200 | 60 | 100 |

Table 3 and FIG. 11B illustrate test results of Examples 2-2 and 7-1 to 7-7.

TABLE 3

|  | width w of groove [mm] | passing ratio of burning test [%] | passing ratio of drop test [%] |
|---|---|---|---|
| Example 2-2 | 0.40 | 100 | 100 |
| Example 7-1 | 0.05 | 60 | 100 |
| Example 7-2 | 0.10 | 100 | 100 |
| Example 7-3 | 0.50 | 100 | 100 |
| Example 7-4 | 0.70 | 100 | 100 |
| Example 7-5 | 1.00 | 100 | 100 |
| Example 7-6 | 1.50 | 100 | 90 |
| Example 7-7 | 2.00 | 100 | 60 |

Table 2 and FIG. 11A indicate the following.

If the thickness t of the groove bottom is less than 0.020 mm, the passing ratio of the drop test tends to decrease. This is because the groove cleaves at the time of the drop test due to too small cleavage strength of the groove, and the contents of the battery easily jump out.

If the thickness t of the groove bottom is more than 0.150 mm, the passing ratio of the burning test tends to decrease. This is because the cleavage strength of the groove (that is, gas cleavage pressure of the groove) is too high, a side surface of the battery and a sealing portion rupture before cleavage of the groove, and the contents of the battery easily jump out of the portions which have ruptured.

Therefore, the thickness t of the groove bottom is preferably 0.020 mm or more than 0.150 mm or less in order to suppress a decrease in the passing ratios of the drop test and the burning test.

Table 3 and FIG. 11B indicate the following.

If the width w of the groove 11Gv is less than 0.10 mm, the passing ratio of the burning test tends to decrease. This is because the cleavage strength of the groove (that is, gas cleavage pressure of the groove) is too high, a side surface of the battery and a sealing portion rupture before cleavage of the groove, and the contents of the battery easily jump out of the portions which have ruptured.

If the width w of the groove 11Gv is more than 1.00 mm, the passing ratio of the drop test tends to decrease. This is because the groove cleaves at the time of the drop test due to too small cleavage strength of the groove, and the contents of the battery easily jump out.

Therefore, the width w of the groove is preferably 0.10 mm or more and 1.00 mm or less in order to suppress a decrease in the passing ratios of the drop test and the burning test.

iii Sample with Volume Energy Density Changed

Comparative Examples 8-1 to 8-7

A battery can having a can bottom without a groove was prepared. Furthermore, as illustrated in Table 4, the volume energy density was changed within a range of 280 Wh/L to 580 Wh/L. A battery was obtained in a similar manner to Example 1-1 except for this change.
(Evaluation)
The batteries of Comparative Examples 8-1 to 8-7 obtained as described above were subjected to a battery burning test in a similar manner to Examples 1-1 to 5-3 and Comparative Examples 1-1 to 7-6 described above.

Figure 12:
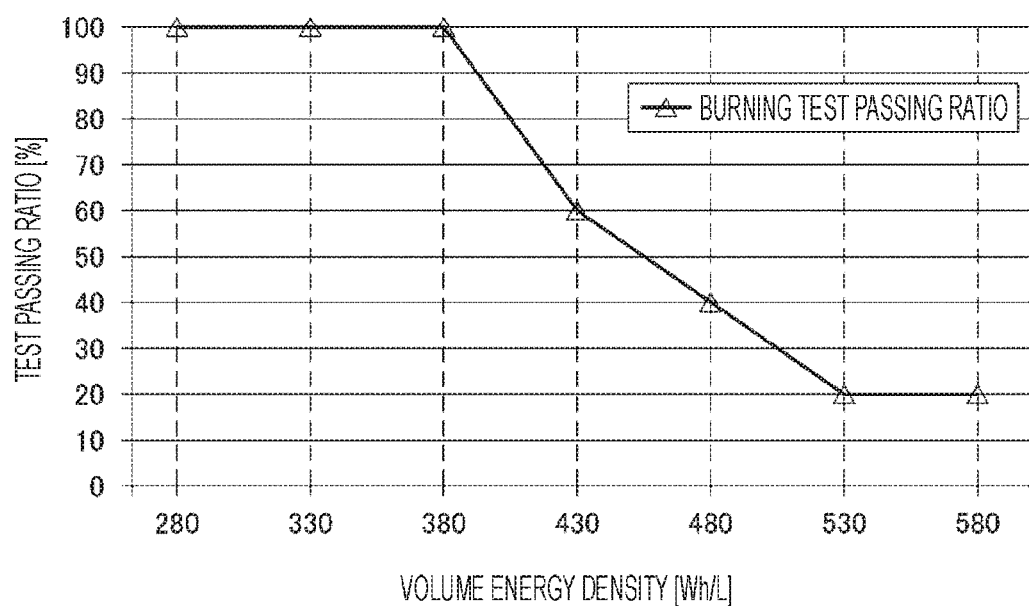
FIG. 12 is a graph illustrating a relationship between a volume energy density of a battery and a test passing ratio.

Table 4 and FIG. 12 illustrate test results of Comparative Examples 8-1 to 8-7.

TABLE 4

|  | volume energy density [Wh/L] | passing ratio of burning test [%] |
|---|---|---|
| Comparative Example 8-1 | 280 | 100 |
| Comparative Example 8-2 | 330 | 100 |
| Comparative Example 8-3 | 380 | 100 |
| Comparative Example 8-4 | 430 | 60 |
| Comparative Example 8-5 | 480 | 40 |
| Comparative Example 8-6 | 530 | 20 |
| Comparative Example 8-7 | 580 | 20 |

Table 4 and FIG. 12 indicate the following.

Within a range in which the volume energy density of a battery is more than 380 Wh/L and 530 Wh/L or less, the passing ratio of the burning test tends to decrease as the volume energy density increases. This is because the gas generation amount increases at the time of the burning test as the volume energy density of a battery increases. Within a range in which the volume energy density of a battery is more than 380 Wh/L and 430 Wh/L or less, a decrease in the passing ratio of the burning test is more significant than a case within a range in which the volume energy density of a battery is more than 430 Wh/L and 530 Wh/L or less.

Therefore, a configuration in which the opening angle of the groove with respect to the center of the arc is 0.5 degrees or more and 56 degrees or less and the ratio of the inner diameter of the groove with respect to the outer diameter of the can bottom is 44% or more and 77% or less is preferably used for a battery having a volume energy density of more than 380 Wh/L, and more preferably used for a battery having a volume energy density of 430 Wh/L or more.

Hereinabove, the embodiments of the present technology, Modification Examples thereof, and Examples have been described specifically. However, the present technology is not limited to the above embodiments, Modification Examples thereof, and Examples, and various modifications based on a technical idea of the present technology can be made.

For example, the configurations, the methods, the steps, the shapes, the materials, the numerical values, and the like exemplified in the above embodiment, Modification Example thereof, and Examples are only examples, and a configuration, a method, a step, a shape, a material, a numerical value, and the like different therefrom may be used, if necessary.

In addition, the configurations, the methods, the steps, the shapes, the materials, the numerical values, and the like in the above embodiment, Modification Example thereof, and Examples can be combined to each other as long as not departing from the gist of the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Furthermore, in the above embodiments, an example in which the present technology is applied to a lithium ion secondary battery has been described. However, the present technology can also be applied to a secondary battery other than the lithium ion secondary battery and a primary battery. However, it is particularly effective to apply the present technology to a lithium ion secondary battery.

In addition, the present technology can adopt the following configurations.

(1) A battery including:
an electrode body; and
a battery can housing the electrode body and having a bottom portion, in which
the bottom portion has an arc-shaped groove,
an opening angle of the groove with respect to a center of the arc is 0.5 degrees or more and 56 degrees or less, and
a ratio of an inner diameter of the groove with respect to an outer diameter of the bottom portion is 44% or more and 77% or less.

(2) The battery according to (1), in which the groove is disposed inside the battery can.

(3) The battery according to (1) or (2), in which a volume energy density of the battery is 430 Wh/L or more.

(4) The battery according to any one of (1) to (3), in which the bottom portion at a bottom of the groove has a thickness of 0.020 mm or more and 0.150 mm or less.

(5) The battery according to any one of (1) to (4), in which the groove has a width of 0.10 mm or more and 1.00 mm or less.

(6) The battery according to any one of (1) to (5), further including a safety valve for releasing gas when the gas is generated in the battery can.

(7) The battery according to (6), in which a gas release pressure of the groove is higher than a gas release pressure of the safety valve.

(8) The battery according to any one of (1) to (7), in which a center of the arc coincides with a center of the bottom portion.

(9) The battery according to any one of (1) to (8), in which a cross-sectional shape of the groove is a substantially trapezoidal shape, a substantially rectangular shape, a substantially triangular shape, a substantially partially circular shape, a substantially partially elliptical shape, or an indefinite shape.

(10) The battery according to any one of (1) to (9), in which
the electrode body includes a positive electrode and a negative electrode, and
an open circuit voltage in a fully charged state per pair of the positive electrode and the negative electrode is 4.4 V or more and 6.00 V or less.

(11) The battery according to any one of (1) to (10), in which the electrode body includes a positive electrode containing a positive electrode active material having an average composition represented by the following formula (1), $$Li_vNi_wM'_xM''_yO_z \qquad (1)$$

(where, $0<v<2$, $w+x+y \leq 1$, $0.8 \leq w \leq 1$, $0 \leq x \leq 0.2$, $0 \leq y \leq 0.2$, and $0<z<3$ are satisfied, and each of M' and M'' represents at least one selected from cobalt (Co), iron (Fe), manganese (Mn), copper (Cu), zinc (Zn), aluminum (Al), chromium (Cr), vanadium (V), titanium (Ti), magnesium (Mg), and zirconium (Zr)).

(12) A battery pack including:
the battery according to any one of (1) to (11); and
a control unit for controlling the battery.

(13) An electronic device including the battery according to any one of (1) to (11), in which
the electronic device receives electric power from the battery.

(14) An electric vehicle including:
the battery according to any one of (1) to (11);
a converter for converting electric power supplied from the battery into a driving force of the vehicle; and
a control device for performing information processing regarding vehicle control on the basis of information regarding the battery.

(15) An electricity storage device including the battery according to any one of (1) to (11), in which
the electricity storage device supplies electric power to an electronic device connected to the battery.

(16) The electricity storage device according to (15), including an electric power information control device for transmitting a signal to or receiving a signal from another device via a network, in which
the electricity storage device performs charge-discharge control of the battery on the basis of information received by the electric power information control device.

(17) An electric power system including the battery according to any one of (1) to (11), in which
the electric power system receives electric power from the battery.

(18) The electric power system according to (17), in which electric power is supplied to the battery from a power generating device or an electric power network.

(19) A battery can including a bottom portion with an arc-shaped groove, in which
an opening angle of the groove with respect to a center of the arc is 0.5 degrees or more and 56 degrees or less, and
a ratio of an inner diameter of the groove with respect to an outer diameter of the bottom portion is 44% or more and 77% or less.

REFERENCE SIGNS LIST

11 Battery can
11Bt Can bottom (bottom portion)
11Gv Groove
12, 13 Insulating plate
14 Battery lid
15 Safety valve mechanism
15A Disk plate
16 Positive temperature coefficient element
17 Gasket
20 Wound electrode body
21 Positive electrode
21A Positive electrode current collector
21B Positive electrode active material layer
22 Negative electrode
22A Negative electrode current collector
22B Negative electrode active material layer
23 Separator
24 Center pin
25 Positive electrode lead
26 Negative electrode lead

The invention claimed is:

1. A battery comprising:
an electrode body; and
a battery can housing the electrode body and having a bottom portion, wherein
the bottom portion has an arc-shaped groove,
an opening angle of the groove with respect to a center of the arc is 0.5 degrees or more and 56 degrees or less, and
a ratio of an inner diameter of the groove with respect to an outer diameter of the bottom portion is 44% or more and 77% or less.

2. The battery according to claim 1, wherein the groove is disposed inside the battery can.

3. The battery according to claim 1, wherein a volume energy density of the battery is 430 Wh/L or more.

4. The battery according to claim 1, wherein the bottom portion at a bottom of the groove has a thickness of 0.020 mm or more and 0.150 mm or less.

5. The battery according to claim 1, wherein the groove has a width of 0.10 mm or more and 1.00 mm or less.

6. The battery according to claim 1, further comprising a safety valve for releasing gas when the gas is generated in the battery can.

7. The battery according to claim 6, wherein a gas release pressure of the groove is higher than a gas release pressure of the safety valve.

8. The battery according to claim 1, wherein a center of the arc coincides with a center of the bottom portion.

9. The battery according to claim 1, wherein a cross-sectional shape of the groove is a substantially trapezoidal shape, a substantially rectangular shape, a substantially triangular shape, a substantially partially circular shape, a substantially partially elliptical shape, or an indefinite shape.

10. The battery according to claim 1, wherein
the electrode body includes a positive electrode and a negative electrode, and
an open circuit voltage in a fully charged state per pair of the positive electrode and the negative electrode is 4.4 V or more and 6.00 V or less.

11. The battery according to claim 1, wherein the electrode body includes a positive electrode containing a positive electrode active material having an average composition represented by the following formula (1), $$Li_vNi_wM'_xM''_yO_z \qquad (1)$$

(where, $0<v<2$, $w+x+y \leq 1$, $0.8 \leq w \leq 1$, $0 \leq x \leq 0.2$, $0 \leq y \leq 0.2$, and $0<z<3$ are satisfied, and each of M' and M'' represents at least one selected from cobalt (Co), iron (Fe), manganese (Mn), copper (Cu), zinc (Zn), aluminum (Al), chromium (Cr), vanadium (V), titanium (Ti), magnesium (Mg), and zirconium (Zr)).

12. A battery pack comprising:
the battery according to claim 1; and
a control unit for controlling the battery.

13. An electronic device comprising the battery according to claim 1, wherein
the electronic device receives electric power from the battery.

14. An electric vehicle comprising:
the battery according to claim 1;
a converter for converting electric power supplied from the battery into a driving force of the vehicle; and
a control device for performing information processing regarding vehicle control on the basis of information regarding the battery.

15. An electricity storage device comprising the battery according to claim 1, wherein
the electricity storage device supplies electric power to an electronic device connected to the battery.

16. The electricity storage device according to claim 15, further comprising an electric power information control device for transmitting a signal to or receiving a signal from another device via a network, wherein
the electricity storage device performs charge-discharge control of the battery on the basis of information received by the electric power information control device.

17. An electric power system comprising the battery according to claim 1, wherein
the electric power system receives electric power from the battery.

18. The electric power system according to claim 17, wherein electric power is supplied to the battery from a power generating device or an electric power network.

19. A battery can comprising a bottom portion with an arc-shaped groove, wherein
an opening angle of the groove with respect to a center of the arc is 0.5 degrees or more and 56 degrees or less, and
a ratio of an inner diameter of the groove with respect to an outer diameter of the bottom portion is 44% or more and 77% or less.

\* \* \* \* \*